(12) United States Patent
Funahashi

(10) Patent No.: US 9,699,535 B2
(45) Date of Patent: Jul. 4, 2017

(54) SOUNDING BODY AND AUDIO REPRODUCTION DEVICE USING SAME, AND MOBILE DEVICE

(71) Applicant: Panasonic Corporation, Osaka (JP)

(72) Inventor: Osamu Funahashi, Mie (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 36 days.

(21) Appl. No.: 14/467,063

(22) Filed: Aug. 25, 2014

(65) Prior Publication Data

US 2014/0363019 A1  Dec. 11, 2014

Related U.S. Application Data

(63) Continuation of application No. PCT/JP2013/001920, filed on Mar. 21, 2013.

(30) Foreign Application Priority Data

Apr. 4, 2012 (JP) .................................. 2012-085400
Apr. 10, 2012 (JP) .................................. 2012-088956
Jun. 19, 2012 (JP) .................................. 2012-137510

(51) Int. Cl.
*H04R 1/00* (2006.01)
*G10K 9/22* (2006.01)
(Continued)

(52) U.S. Cl.
CPC .............. *H04R 1/00* (2013.01); *B60Q 5/008* (2013.01); *B60R 11/0217* (2013.01);
(Continued)

(58) Field of Classification Search
CPC ... H04R 1/00; H04R 1/02; H04R 7/00; H04R 7/04; H04R 9/06; H04R 9/063; H04R 9/066; H04R 15/00; H04R 2499/13; H04R 1/283; H04R 1/2834; B60R 11/0217; B60R 13/005; G10K 9/13; G10K 9/22;
(Continued)

(56) References Cited

U.S. PATENT DOCUMENTS 4,819,269 A * 4/1989 Klayman .................. H04S 3/00
381/302
2002/0136423 A1* 9/2002 Fukuda .................. H04R 1/025
381/398

(Continued)

FOREIGN PATENT DOCUMENTS

JP  63-110047  5/1988
JP  04-358936  12/1992
(Continued)

OTHER PUBLICATIONS

International Search Report of PCT Application No. PCT/JP2013/001920 dated Jun. 25, 2013.

*Primary Examiner* — Vivian Chin
*Assistant Examiner* — Jason R Kurr
(74) *Attorney, Agent, or Firm* — Panasonic IP Management; Kerry S. Culpepper

(57) ABSTRACT

A sounding body is included in an audio reproduction device mounted on a mobile device. At least a part of the sounding body also serves as at least a part of one of an emblem, a horn section, and a mirror section of the mobile device.

10 Claims, 26 Drawing Sheets

(51) Int. Cl.
| | |
|---|---|
| G10K 9/13 | (2006.01) |
| B60R 11/02 | (2006.01) |
| H04R 9/06 | (2006.01) |
| H04R 15/00 | (2006.01) |
| B60R 13/00 | (2006.01) |
| B60Q 5/00 | (2006.01) |
| H04R 1/02 | (2006.01) |
| H04R 7/04 | (2006.01) |
| B60Q 1/26 | (2006.01) |
| B60Q 1/34 | (2006.01) |

(52) U.S. Cl.
CPC .............. *B60R 13/005* (2013.01); *G10K 9/13* (2013.01); *G10K 9/22* (2013.01); *H04R 9/063* (2013.01); *H04R 15/00* (2013.01); *B60Q 1/2661* (2013.01); *B60Q 1/2665* (2013.01); *B60Q 1/34* (2013.01); *H04R 1/02* (2013.01); *H04R 7/04* (2013.01); *H04R 9/066* (2013.01); *H04R 2499/13* (2013.01)

(58) Field of Classification Search
CPC ........ B60Q 1/34; B60Q 5/008; B60Q 1/2661; B60Q 1/2665

USPC ......... 381/86, 152, 340, 190, 396, 398, 400, 381/412, 420, 423, 431
See application file for complete search history.

(56) References Cited

U.S. PATENT DOCUMENTS

| | | | |
|---|---|---|---|
| 2005/0185816 A1* | 8/2005 | Roark | H04R 9/06 381/400 |
| 2007/0261912 A1* | 11/2007 | Langberg | H04R 7/04 181/171 |
| 2010/0135516 A1* | 6/2010 | Saiki | H04R 1/2811 381/386 |
| 2012/0106777 A1* | 5/2012 | Fujimoto | H04R 9/043 381/413 |

FOREIGN PATENT DOCUMENTS

| | | |
|---|---|---|
| JP | 2007-283809 | 11/2007 |
| JP | 2011-031695 | 2/2011 |
| JP | 2011-031865 | 2/2011 |
| JP | 2011-183964 | 9/2011 |
| JP | 2011-245966 | 12/2011 |

* cited by examiner

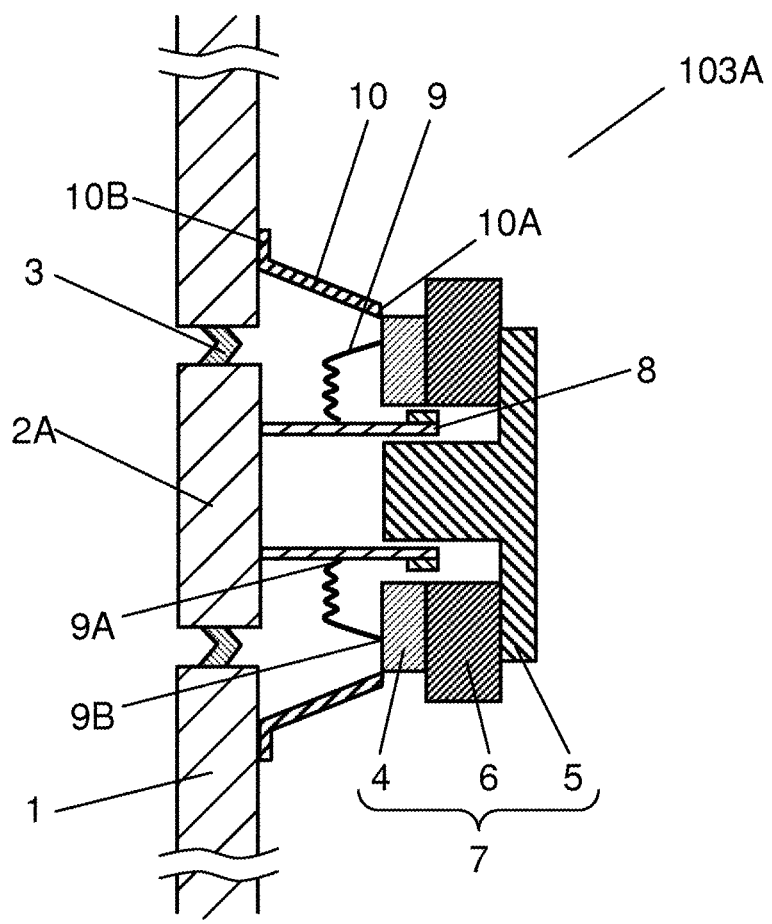

SOUNDING BODY AND AUDIO REPRODUCTION DEVICE USING SAME, AND MOBILE DEVICE

BACKGROUND

1. Technical Field

The present disclosure relates to an audio reproduction device that is mounted in a mobile device such as an electric automobile and a hybrid car and produces a pseudo engine sound or the like when the mobile device travels only with a motor, and to a sounding body used in the audio reproduction device. The present disclosure relates to a mobile device in which the audio reproduction device is mounted.

2. Background Art

FIG. 21 is a block diagram showing a configuration of a conventional audio reproduction device, and FIG. 22 is a conceptual diagram showing a state where a loudspeaker of the audio reproduction device is disposed.

As shown in FIG. 21, the conventional audio reproduction device includes sound source 33, amplifier 34 for amplifying a signal output from sound source 33, and loudspeaker 35 for reproducing the signal amplified by amplifier 34. As shown in FIG. 22, loudspeaker 35 is disposed in an engine compartment, and a pseudo engine sound or the like is produced toward the inside of the engine compartment. In such a configuration, even when a mobile device travels only with a motor and an actual engine sound is not produced, an approach of the travelling mobile device can be announced to a pedestrian or the like.

SUMMARY

The present disclosure provides an audio reproduction device that is mounted in a mobile device such as an electric automobile and a hybrid car and is used to announce an approach of a travelling mobile device to a pedestrian or the like by producing a pseudo engine sound or the like when the mobile device travels only with a motor. The present disclosure also provides a sounding body used in the audio reproduction device. The present disclosure finally provides a mobile device including the audio reproduction device.

The sounding body of the present disclosure is included in an audio reproduction device mounted in a mobile device. At least a part of the sounding body also serves as at least a part of one of an emblem, a horn section, and a mirror section of the mobile device. The audio reproduction device of the present disclosure includes an amplifier for amplifying a sound source signal, and a sounding body for reproducing the signal amplified by the amplifier. The sounding body has the above-mentioned configuration. The mobile device of the present disclosure includes the above-mentioned audio reproduction device, a sound source for supplying a sound source signal to the amplifier, a main body having the audio reproduction device and sound source, and at least one of an emblem mounted on an exterior member of the main body, a horn section mounted on a front of the main body, and mirror sections mounted on both sides of the main body, respectively.

Thanks to these configurations, the sounding body can directly and efficiently emit a sound to the outside of the mobile device comparing with a conventional configuration where the sounding body is mounted deeply in a central part in the engine compartment of the mobile device and produces a sound toward the inside of the engine compartment. Therefore, the sounding body can call attention of a pedestrian or the like by certainly announcing an approach of the mobile device at a sufficient sound volume and with a high sound quality, and can secure the extremely high safety.

BRIEF DESCRIPTION OF DRAWINGS

FIG. 2 is a sectional view showing a configuration of a sounding body in accordance with a first exemplary embodiment of the present disclosure.

DETAILED DESCRIPTION OF PREFERRED EMBODIMENTS

Figure 21:
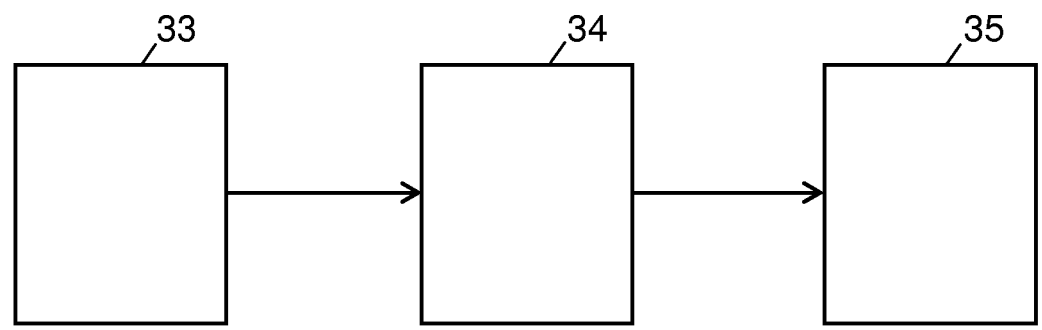
FIG. 21 is a block diagram showing a configuration of a conventional audio reproduction device.
Figure 22:
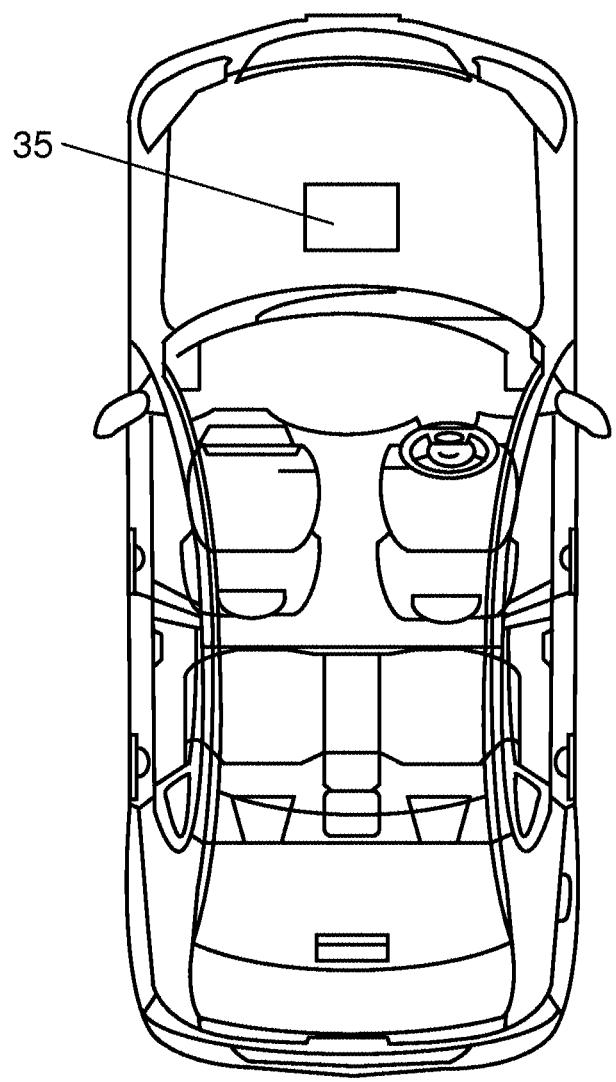
FIG. 22 is a conceptual diagram showing a state where a loudspeaker of the conventional audio reproduction device is disposed.

Prior to the description of the exemplary embodiments of the present disclosure, problems of a conventional audio reproduction device shown in FIG. 21 and FIG. 22 are described. As shown in FIG. 22, loudspeaker 35 of the conventional audio reproduction device is disposed in an engine compartment, and reproduces a pseudo engine sound or the like toward the inside of the engine compartment. Therefore, it can be difficult to certainly announce an approach of a mobile device to a pedestrian or the like walking outside the mobile device.

Many large components such as a motor, an engine, and a power controller are mounted in the engine compartment of a mobile device such as an electric automobile and a hybrid car. Therefore, there is little mounting space for loudspeaker 35 in the engine compartment. Loudspeaker 35 therefore must be mounted deeply in a central part in the engine compartment although loudspeaker 35 is a component for reproducing a sound to the outside of the mobile device. As a result, loudspeaker 35 has a configuration to reproduce a sound toward the inside of the engine compartment.

In these configurations, the reproduction efficiency of loudspeaker 35 to the outside of the mobile device extremely reduces, and the pseudo engine sound or the like is not sufficiently heard by a pedestrian or the like walking outside the mobile device.

Figure 23:
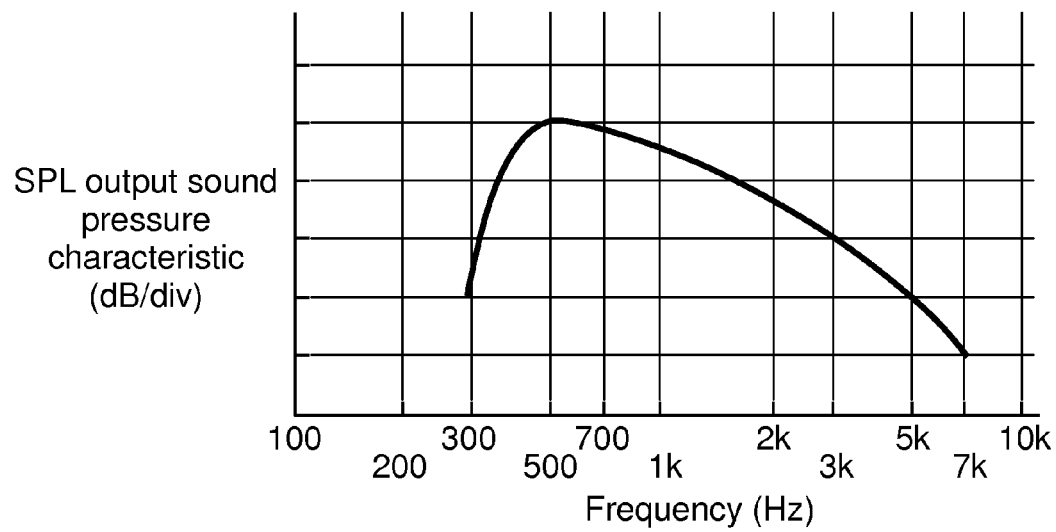
FIG. 23 is a frequency characteristic diagram of output sound pressure of the conventional audio reproduction device.

FIG. 23 is a frequency characteristic diagram of output sound pressure that shows an example of an output sound pressure characteristic of the conventional audio reproduction device that is obtained 2 m ahead of the mobile device. As shown in FIG. 23, it is not avoidable that the sound volume of loudspeaker 35 decreases or the attenuation at a high frequency causes sound quality degradation or the like. As a result, it is difficult to certainly announce an approach of the mobile device, a pedestrian or the like hardly recognizes the approach of the mobile device, and hence an accident can occur.

Hereinafter, exemplary embodiments of the present disclosure will be described hereinafter with reference to the accompanying drawings. Elements similar to those in the preceding exemplary embodiments are denoted with the same reference marks, and the detailed descriptions of those elements are omitted.

Figure 1A:
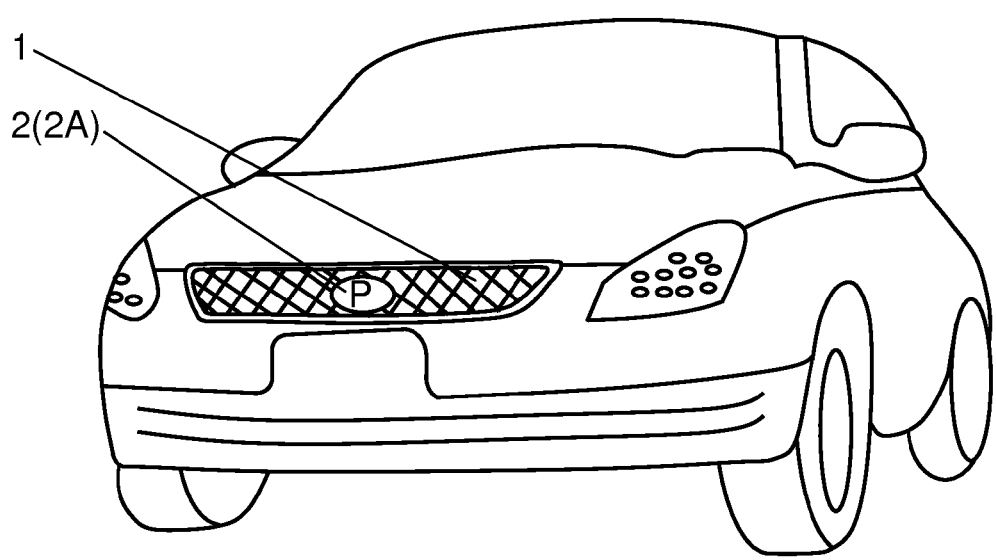
FIG. 1A is a perspective view of an automobile as a mobile device in accordance with exemplary embodiments of the present disclosure.
Figure 1B:
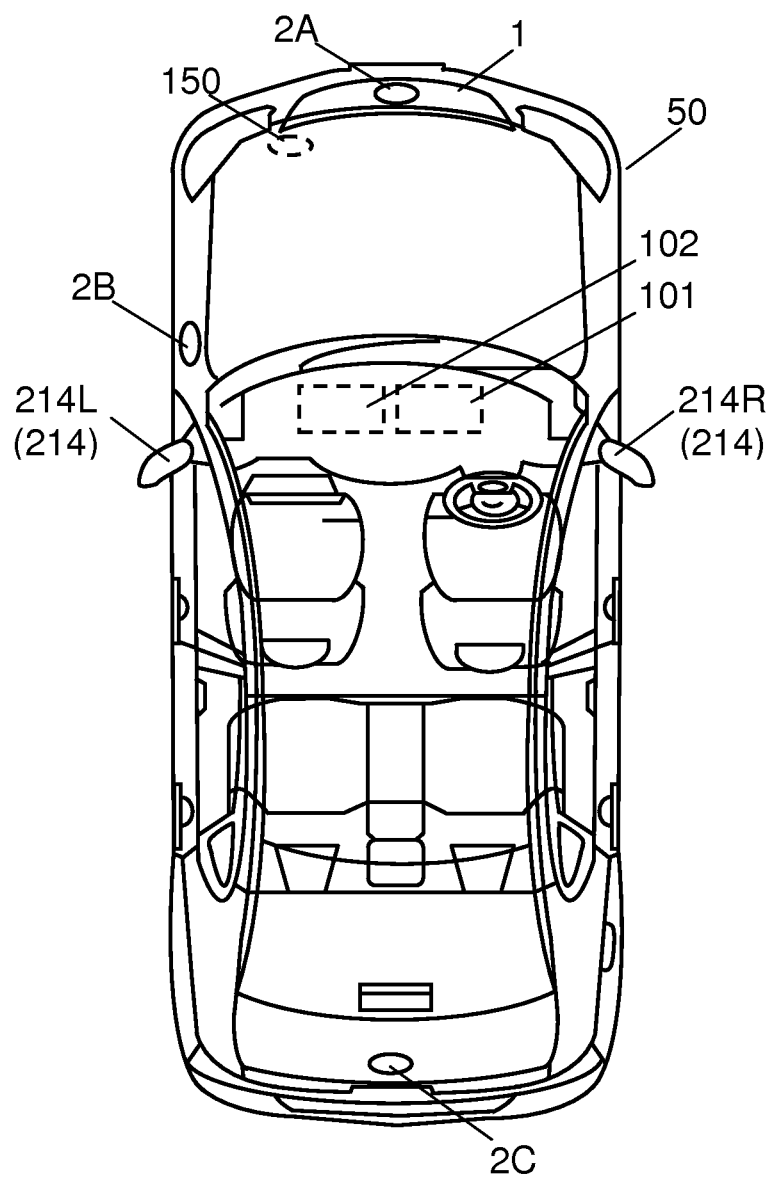
FIG. 1B is a top view of the mobile device shown in FIG. 1A.

FIG. 1A is a perspective view of an automobile as a mobile device in accordance with the exemplary embodiment of the present disclosure. FIG. 1B is a top view of the mobile device shown in FIG. 1A.

The mobile device of the exemplary embodiments is an electric automobile or hybrid car, for example, and has mode in which it travels without producing an engine sound. The mobile device may be a vehicle other than a four-wheel car as long as it does not produce an engine sound. In other words, the mobile device is not limited to an automobile, and may have any configuration as long as it is driven at least by an electric motor. For example, the mobile device may be a motorcycle, a forklift, or a vehicle for agricultural work or forestry work.

As shown in FIG. 1A and FIG. 1B, the mobile device includes sound source 101, amplifier 102, and main body 50. The mobile device includes at least one of emblem 2 (2A to 2C), horn section 150, and mirror section 214.

Sound source 101 possesses a sound source signal and supplies the sound source signal to amplifier 102. Amplifier 102 amplifies the sound source signal. Sound source 101 and amplifier 102 are mounted on main body 50. Emblem 2A is mounted on front grille 1 that is an exterior member of main body 50 and is disposed on a front. Emblem 2 may include emblem 2B disposed on a side or emblem 2C disposed on a rear in addition to emblem 2A disposed on the front of main body 50.

Horn section 150 is mounted on the front of main body 50. Mirror section 214 includes right mirror section 214R and left mirror section 214L, and they are mounted on both sides of main body 50. Alternatively, mirror section 214 may include a rear mirror section (not shown) mounted on the rear.

Figure 1C:
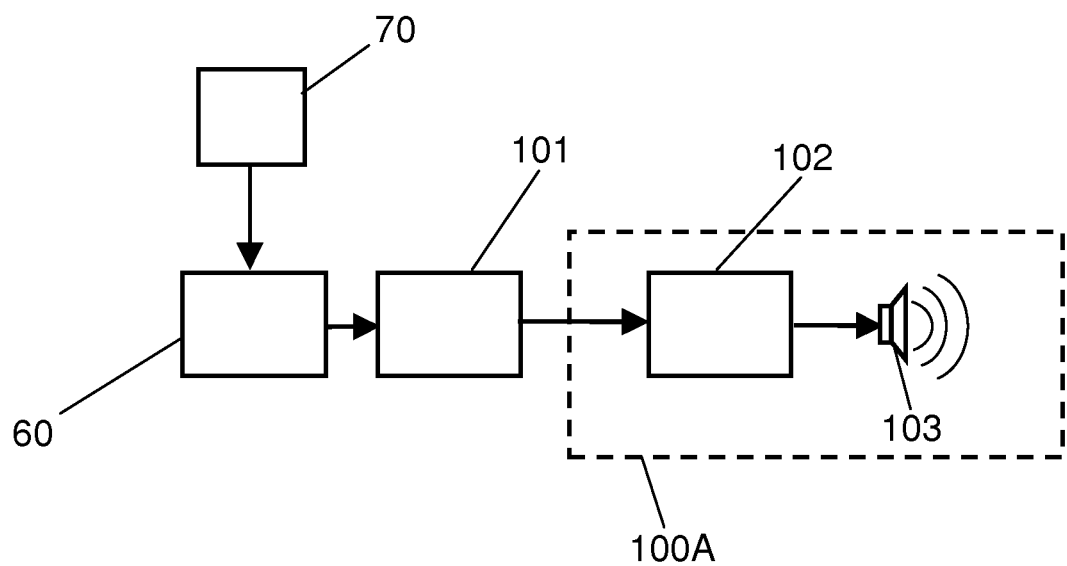
FIG. 1C is a block diagram showing a configuration of an audio reproduction device in accordance with the exemplary embodiments of the present disclosure.

FIG. 1C is a block diagram showing a configuration of an audio reproduction device in accordance with the exemplary embodiment. Audio reproduction device 100A includes amplifier 102 and sounding body 103. Sounding body 103 reproduces a signal amplified by amplifier 102. At least a part of sounding body 103 also serves as at least a part of one of emblems 2A to 2C, horn section 150, and mirror section 214 shown in FIG. 1B. Therefore, sounding body 103 is also mounted on main body 50.

In FIG. 1C, sound source 101 is controlled by control section 60. Control section 60 receives a signal from detecting section 70. Detecting section 70 is an accelerator pedal, an acceleration sensor, or a vehicle speed measuring apparatus, for example, and outputs the speed or acceleration of the mobile device, or a signal related to them. Control section 60 controls sound source 101 in response to the signal from detecting section 70, and makes sound source 101 send a sound source signal to amplifier 102. Alternatively, an input section (not shown) may be employed instead of detecting section 70, a driver may manually send control section 60 a signal for making sounding body 103 reproduce a pseudo engine sound or the like.

Thanks to the above-mentioned configuration, audio reproduction device 100A can directly and efficiently emit a sound to the outside of the mobile device. Therefore, the reproduction efficiency when the mobile device emits a sound to the outside is improved, thereby preventing the sound volume decrease and sound quality degradation. As a result, the mobile device can certainly call attention of a pedestrian or the like at a sufficient sound volume and with a high sound quality, and can secure the extremely high safety.

The pedestrian or the like mainly includes a walking person, and includes a person at rest such as a simply standing person or sitting person. The pedestrian or the like also includes a bicycle or motorcycle other than a person, and also includes an animal such as a dog and a cat other than a human. In addition, the pedestrian or the like may include another automobile or the like. In other words, the pedestrian or the like includes all of the objects that must direct their attention to an approach of an automobile.

Sounding body 103 is mounted on an outer periphery of the mobile device or a part close to the outer periphery. Therefore, sounding body 103 can more certainly announce an approach of the mobile device to a pedestrian or the like walking in the surroundings of the mobile device.

Here, the surroundings mean the forward direction and side direction of the mobile device when the mobile device travels forward. The surroundings mean the backward direction of the mobile device when the mobile device travels backward. Therefore, the surroundings of the mobile device include all of the forward direction, side direction, and backward direction.

FIRST EXEMPLARY EMBODIMENT

In the first exemplary embodiment, an example where sounding body 103 is mounted on the front of main body 50 is described as one example with reference to FIG. 1A to FIG. 6.

As shown in FIG. 1A and FIG. 1B, front grille 1 is disposed on the front of the mobile device, and constitutes a part of main body 50 of the mobile device. Emblem 2A is disposed on front grille 1. Emblem 2A generally has a unique mark designed to allow identification of an automobile manufacture or the like.

FIG. 2 is a sectional view showing the configuration of sounding body 103A in accordance with the present exemplary embodiment. Sounding body 103A includes voice coil 8, magnetic circuit 7, and frame 10. Sounding body 103A uses emblem 2A as a vibrating body. In other words, the vibrating body of sounding body 103A also serves as emblem 2A that is an exterior member and is mounted on the front of main body 50 of the mobile device.

Magnetic circuit 7 is formed by bonding yoke 5, magnet 6, and plate 4 together in a lamination state, and is provided with an annular magnetic gap. Then, voice coil 8 is inserted into the magnetic gap.

A tip of voice coil 8 is directly bonded to the rear surface of emblem 2A as the vibrating body. Frame 10 includes bottom 10A bonded to magnetic circuit 7, and upper part 10B that is bonded to the rear surface of front grille 1 and supports emblem 2A via front grille 1 with respect to magnetic circuit 7.

Sounding body 103A further includes suspension 9. Central part 9A of suspension 9 supports voice coil 8, and outer periphery 9B is bonded to plate 4 or frame 10.

Sounding body 103A having such a configuration and an audio reproduction device including it are hereinafter described in detail. A signal such as a pseudo engine sound or the like for announcing an approach of the mobile device is amplified by amplifier 102 shown in FIG. 1B, and is input to voice coil 8. A magnetic force of magnetic circuit 7 caused in response to this signal vibrates voice coil 8 and emblem 2A connected to voice coil 8, and reproduces a pseudo engine sound or the like for announcing an approach of the mobile device.

Front grille 1 is not an especially necessary component, and may be a bonnet front part or the like of the mobile device. When emblem 2A can be attached to it, a similar effect can be produced.

Preferably, emblem 2A is mechanically bonded to front grille 1 via thin resin section 3. Resin section 3 is disposed to attach emblem 2A to front grille 1 as an exterior member. Resin section 3 is more apt to deform than emblem 2A as the vibrating body. In this configuration, actually vibrating emblem 2A and voice coil 8 are supported by front grille 1 and frame 10 via resin section 3 and suspension 9. Therefore, emblem 2A and voice coil 8 can accurately perform a piston movement.

Figure 3:
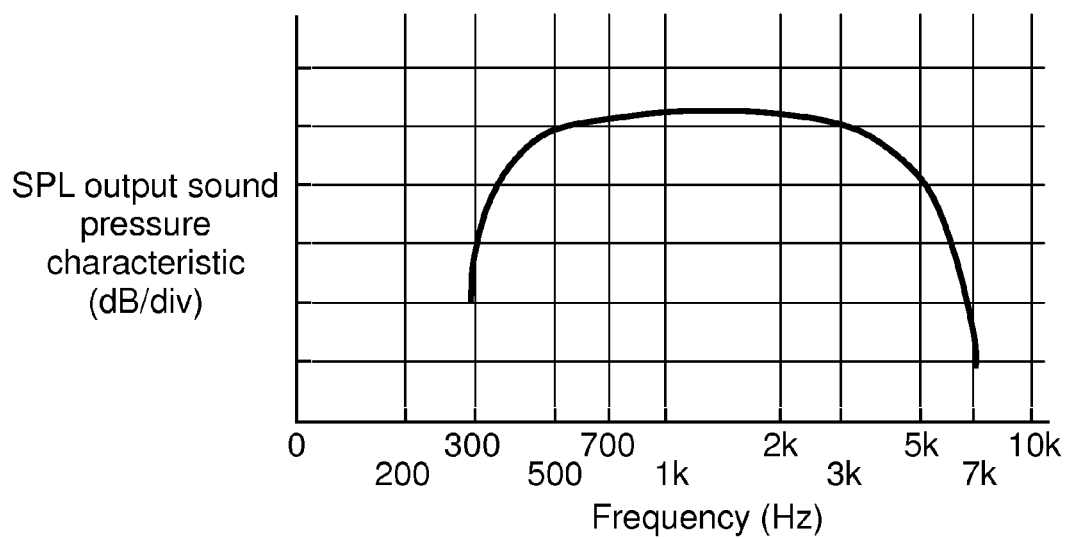
FIG. 3 is a frequency characteristic diagram of output sound pressure of the sounding body shown in FIG. 2.

FIG. 3 is a frequency characteristic diagram of output sound pressure of sounding body 103A that is obtained 2 m ahead of the mobile device. As shown in FIG. 3, sounding body 103A can output a sound at a sufficient sound pressure in the whole frequency band from a low frequency to a high frequency. Sounding body 103A produces a remarkable effect even in comparison with the frequency characteristic diagram of output sound pressure shown in FIG. 23.

Sounding body 103A vibrates emblem 2A of an automobile manufacture or the like disposed in a front part of the mobile device, and reproduces a pseudo engine sound or the like for announcing an approach of the mobile device. Therefore, the appearance of the mobile device is not damaged. This configuration can suppress the sound volume decrease and sound quality degradation. Therefore, sounding body 103A can certainly announce an approach of the mobile device to a pedestrian or the like at a sufficient sound volume and with a high sound quality. An additional loudspeaker does not need to be newly attached to the mobile device, and the configuration of audio reproduction device 100A can be extremely simplified.

Resin section 3 does not need to completely seal the clearance between front grille 1 and emblem 2A, and a hole may be formed in accordance with a desired frequency characteristic of output sound pressure.

In the above-mentioned description, emblem 2A is mechanically bonded to front grille 1 via thin resin section 3. However, the present disclosure is not limited to this configuration. Emblem 2A may be configured integrally with front grille 1. Emblem 2A may have any configuration as long as emblem 2A can be vibrated by voice coil 8.

Figure 4:
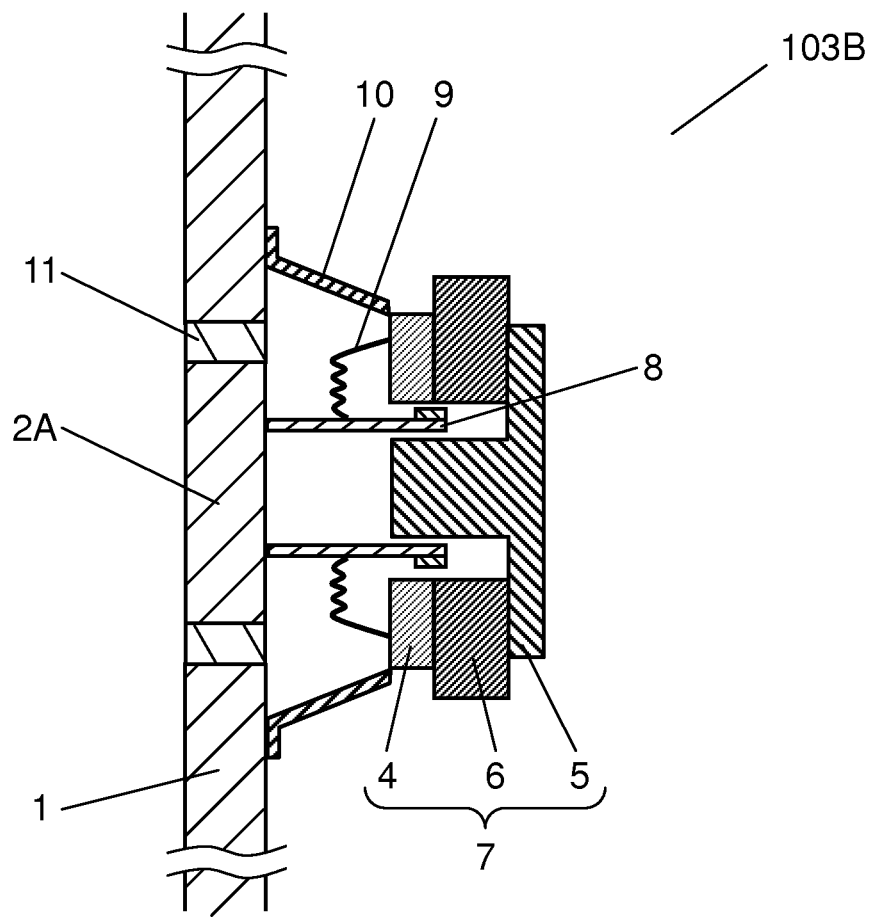
FIG. 4 is a sectional view showing a configuration of another sounding body in accordance with the first exemplary embodiment of the present disclosure.

Next, a sounding body having a different configuration is described with reference to FIG. 4. FIG. 4 is a sectional view showing a configuration of another sounding body 103B in accordance with the present exemplary embodiment.

Sounding body 103B is different from sounding body 103A in that emblem 2A is mechanically bonded to front grille 1 via elastic sealing agent 11. In other words, sounding body 103B has a configuration obtained by replacing thin resin section 3 in sounding body 103A by elastic sealing agent 11. The configuration except this point is similar to that of sounding body 103A.

In this configuration, actually vibrating emblem 2A and voice coil 8 are supported by front grille 1 and frame 10 via elastic sealing agent 11 and suspension 9. Elastic sealing agent 11 is disposed to attach emblem 2A to front grille 1 as the exterior member. Elastic sealing agent 11 is more apt to deform than emblem 2A as the vibrating body. Thanks to this configuration, emblem 2A and voice coil 8 can accurately perform a piston movement. Therefore, sounding body 103B produces an effect similar to that of sounding body 103A.

Elastic sealing agent 11 can be made of a silicone-based adhesive or rubber. As the rubber, elastomer, synthetic rubber, or natural rubber can be employed. Instead of elastic sealing agent 11, an elastic body may be disposed on the outer periphery of emblem 2A, and emblem 2A may be fixed to front grille 1 via the elastic body using the adhesive or the like. In this case, the elastic body does not need to be bonded to the whole outer periphery of emblem 2A.

Figure 5:
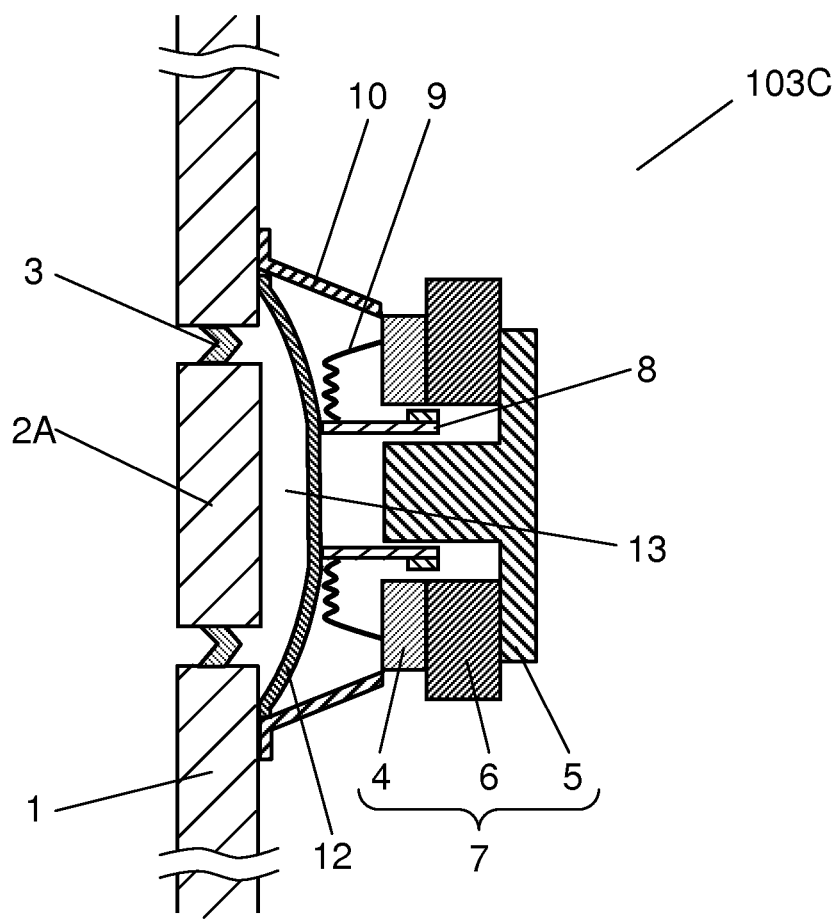
FIG. 5 is a sectional view showing a configuration of yet another sounding body in accordance with the first exemplary embodiment of the present disclosure.

Next, a sounding body having a further different configuration is described with reference to FIG. 5. FIG. 5 is a sectional view showing a configuration of yet another sounding body 103C in accordance with the present exemplary embodiment.

Sounding body 103C is different from sounding body 103A in that diaphragm 12 is bonded to a tip of voice coil 8, and emblem 2A is bonded to voice coil 8 via cavity 13. The configuration except this point is similar to that of sounding body 103A.

Specifically, a central part of the rear surface of diaphragm 12 is bonded to the tip of voice coil 8. The rim of diaphragm 12 is bonded to the rim of the upper end of frame 10. Cavity 13 is formed between diaphragm 12 and the rear surface of emblem 2. Cavity 13 allows a passive radiator type loudspeaker to be formed.

In sounding body 103C, a signal such as a pseudo engine sound or the like for announcing an approach of the mobile device is input to voice coil 8. In accordance with this signal, voice coil 8, diaphragm 12 connected to voice coil 8, cavity 13, and emblem 2A are vibrated in this sequence by a magnetic force of magnetic circuit 7. Thus, a pseudo engine sound or the like for announcing an approach of the mobile device is emitted.

Actually vibrating emblem 2A, diaphragm 12, and voice coil 8 are supported by front grille 1 and frame 10 via thin resin section 3, the outer periphery of diaphragm 12, and suspension 9. Thus, emblem 2A, diaphragm 12, and voice coil 8 can accurately perform a piston movement.

Figure 6:
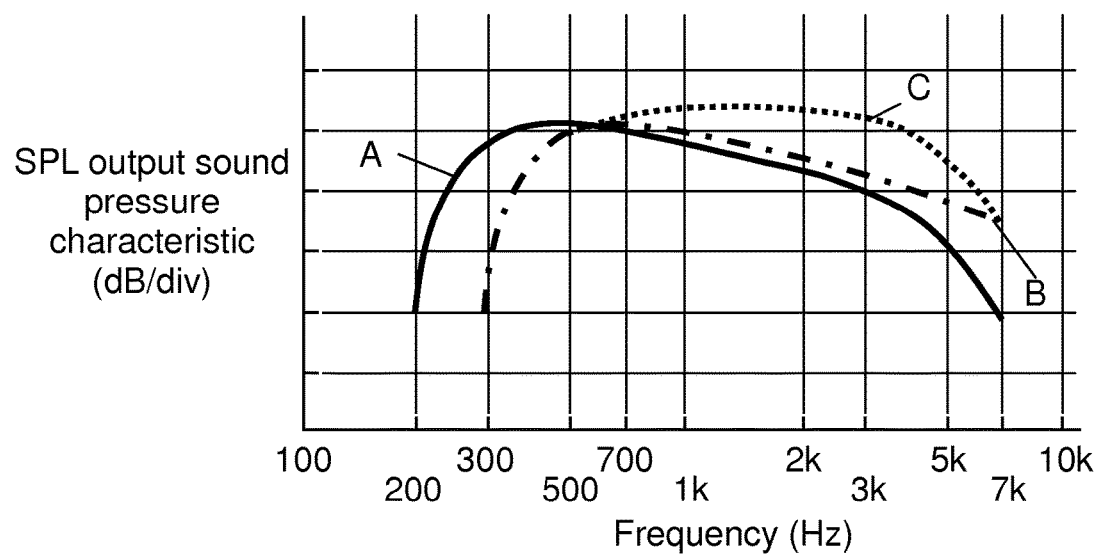
FIG. 6 is a frequency characteristic diagram of output sound pressure of the sounding body shown in FIG. 5.

FIG. 6 is a frequency characteristic diagram of output sound pressure of sounding body 103C. In this diagram, curve A shows the measurement result when cavity 13 is sealed, curve B shows the result when a hole is formed in resin section 3, and curve C shows the result when many holes are formed in resin section 3, front grille 1, and emblem 2A. As is clear from FIG. 6, in all of the above-mentioned configurations, sounding body 103C can output a sound at a sufficient sound pressure in the whole frequency band from a low frequency to a high frequency comparing with the frequency characteristic diagram of output sound pressure of the conventional audio reproduction device shown in FIG. 23. The frequency characteristic of output sound pressure can be adjusted to a desired characteristic by partially opening cavity 13 from the sealed state by forming a hole in resin section 3 or the like.

In sounding body 103C, elastic sealing agent 11 of FIG. 4 may be used instead of resin section 3, or emblem 2A may be configured integrally with front grille 1. Emblem 2A may have any configuration as long as emblem 2A can be vibrated via voice coil 8, diaphragm 12, and cavity 13.

In sounding bodies 103A to 103C, front grille 1 and emblem 2A of an automobile manufacture or the like that are located in a front part of the mobile device are used as a vibrating body. Front grille 1 and emblem 2 are designed as a component that is originally located in a front part of the mobile device. Therefore, in consideration of the wind pressure when an automobile travels at a high speed and the water droplets when the automobile travels in the rain, environmental resistance such as quality or reliability is secured. Therefore, the environmental resistance is extremely higher than that of a conventional loudspeaker that is mounted deeply in a central part in the engine compartment and produces a sound toward the inside of the engine compartment of the mobile device.

In the case where a conventional loudspeaker that has a diaphragm made of paper or thin resin is mounted on a front part of the mobile device so that the diaphragm points ahead of the mobile device, the environmental resistance such as quality or reliability cannot be secured. When the conventional loudspeaker is mounted on the front part of the mobile device so that the diaphragm points ahead of the mobile device, the loudspeaker can be damaged by the wind pressure when the mobile device travels at a high speed, and by the water droplets when the mobile device travels in the rain.

Also from such a viewpoint, in sounding bodies 103A to 103C, it is extremely effective that front grille 1 and emblem 2A that are located in a front part of the mobile device are used as the vibrating body.

Sounding bodies 103A to 103C mounted on the front surface of the mobile device have been described as an example. However, emblem 2B mounted on the side of the mobile device or emblem 2C mounted on the rear may be used as the vibrating body. In all of these cases, a similar effect is produced. Furthermore, when sounding bodies are mounted so that two or more of emblems 2A, 2B, and 2C are used as the vibrating bodies, a higher effect can be produced.

SECOND EXEMPLARY EMBODIMENT

Figure 7:
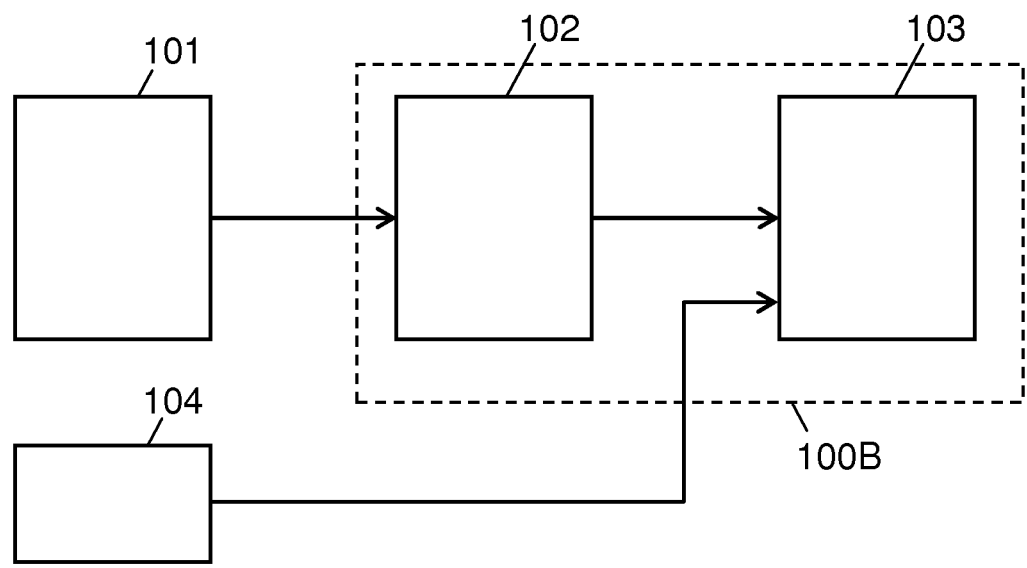
FIG. 7 is a block diagram showing a configuration of an audio reproduction device in accordance with a second exemplary embodiment of the present disclosure.

FIG. 7 is a block diagram showing a configuration of an audio reproduction device in accordance with a second exemplary embodiment of the present disclosure. Audio reproduction device 100B of the present exemplary embodiment is different from audio reproduction device 100A of the first exemplary embodiment shown in FIG. 1C in that sounding body 103 receives not only an amplified sound source signal sent from amplifier 102 but also a horn signal sent from horn signal generating section 104. The horn signal means a signal for honking a horn of the mobile device. In other words, sounding body 103 of the present exemplary embodiment has a configuration where a loudspeaker section and a horn section share some components and are integrated. The amplified sound source signal is input to the loudspeaker section, and the horn signal is input to the horn section. Sounding body 103 is mounted on a front of the mobile device on which a normal horn is mounted. The configuration except this point is similar to that of the first exemplary embodiment. Hereinafter, a specific example of sounding body 103 in the present exemplary embodiment is described with reference to FIG. 8 to FIG. 10.

Figure 8:
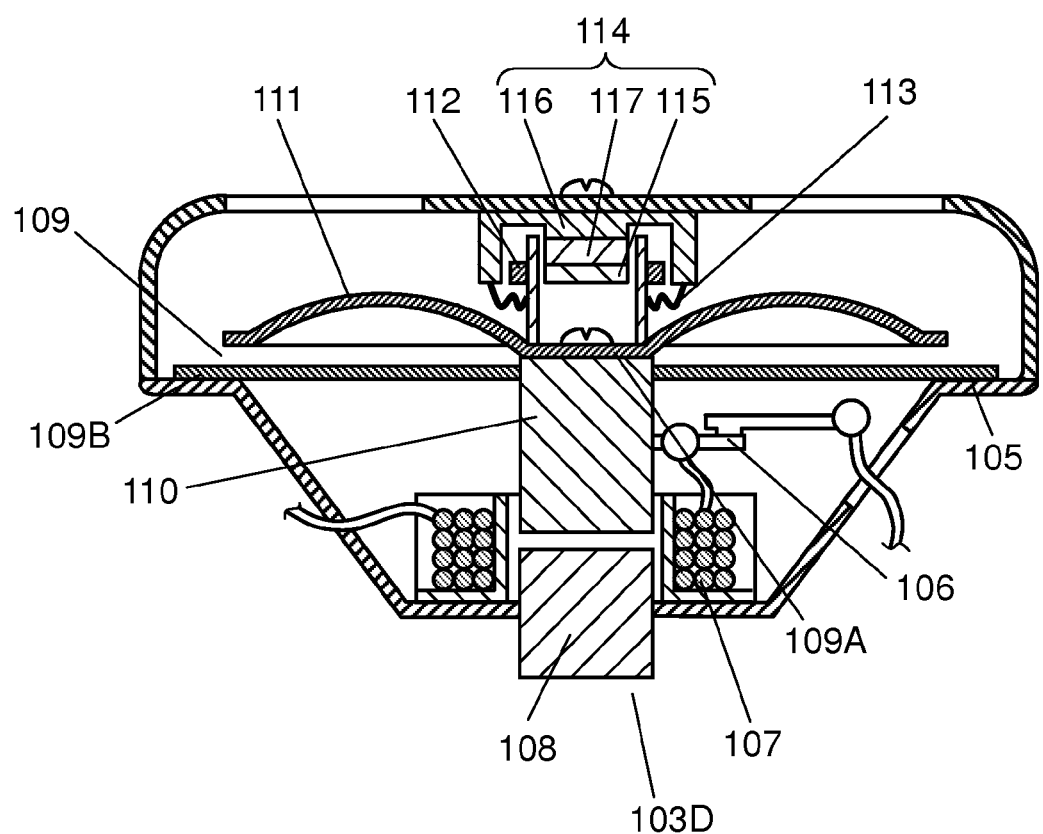
FIG. 8 is a sectional view of a sounding body in accordance with the second exemplary embodiment of the present disclosure.

FIG. 8 is a sectional view of sounding body 103D in accordance with the present exemplary embodiment. Sounding body 103D includes magnetic coil 107, pole 108 inserted into magnetic coil 107, housing 105, shaft 110, diaphragm 109, resonator 111, magnetic circuit 114, voice coil 112, and suspension 113.

Magnetic coil 107 is supplied with current of horn signal generating section 104 shown in FIG. 7 via contact point 106. Pole 108 is inserted into magnetic coil 107, and constitutes an electromagnet integrally with magnetic coil 107. Housing 105 is a casing of sounding body 103D and is bonded to the electromagnet. In other words, magnetic coil 107 and pole 108 are bonded to the inner bottom of housing 105. Housing 105 is made of metal or resin. Shaft 110 is vertically (in the drawing) driven by a magnetic force generated in pole 108. Diaphragm 109 includes central part 109A for holding shaft 110, and outer periphery 109B bonded to housing 105. Resonator 111 is bonded to the upper end surface of shaft 110, namely on the opposite side to pole 108. In the above-mentioned configuration, a horn section for giving a honk is disposed. In other words, the electromagnet, housing 105, shaft 110, diaphragm 109, and resonator 111 constitute the horn section that is mounted on the front of the mobile device.

The bottom surface of magnetic circuit 114 is bonded to the inner surface of an upper part of housing 105. Magnetic circuit 114 is formed by bonding yoke 116, magnet 117, and plate 115 together in a lamination state. Magnetic circuit 114 is provided with an annular magnetic gap. The magnetic gap is disposed so as to face diaphragm 109 or shaft 110. In other words, the magnetic gap is disposed so as to face the horn section. Voice coil 112 is inserted into the magnetic gap. The tip of voice coil 112 is bonded to resonator 111. Suspension 113 holds voice coil 112 in its central part, and the rim of suspension 113 is bonded to magnetic circuit 114. In this configuration, a loudspeaker section for reproducing a sound for announcing an approach of the mobile device is formed. In other words, magnetic circuit 114, voice coil 112, and at least one of diaphragm 109 and resonator 111 constitute a loudspeaker section. Voice coil 112 receives a sound source signal amplified by amplifier 102 shown in FIG. 7.

Audio reproduction device 100B including sounding body 103D that is formed of the horn section and the loudspeaker section is hereinafter described in detail.

First, an operation as the horn section is described. When a horn signal is sent from horn signal generating section 104 to magnetic coil 107 via contact point 106, a magnetic force generated in magnetic coil 107 produces a magnetic field via pole 108. Due to this magnetic force, shaft 110 held by diaphragm 109 and resonator 111 bonded to the upper end surface of shaft 110 are attracted to pole 108.

At this time, simultaneously contact point 106 is driven to be turned off, and the horn signal to magnetic coil 107 is blocked. Therefore, shaft 110 and resonator 111 are returned to original positions by a restoring force of diaphragm 109. Then, contact point 106 is turned on again, so that shaft 110 and resonator 111 are attracted to pole 108 again.

As discussed above, in the horn section, when a horn signal is input to magnetic coil 107, magnetic coil 107 repeats ON and OFF states. Thus, resonator 111 vibrates vertically (in the drawing) to give a honk.

Next, an operation as the loudspeaker section is described. A signal output from sound source 101 is power-amplified by amplifier 102, and is input to voice coil 112. In response to this signal, voice coil 112, resonator 111 bonded to the tip of voice coil 112, and diaphragm 109 are vibrated vertically (in the drawing) by the magnetic force of magnetic circuit 114. Due to this vibration, a pseudo engine sound or the like for announcing an approach of the mobile device is reproduced from resonator 111. Thus, resonator 111 and diaphragm 109 can be driven by any of magnetic coil 107 and voice coil 112.

The outer shape of sounding body 103D formed of the horn section and the loudspeaker section is similar to that of a conventional horn, so that sounding body 103D is attached to a position that is in a front part of the mobile device and has few obstacles. Therefore, by vibrating resonator 111 with voice coil 112 to reproduce a sound for announcing an approach of the mobile device, the occurrence of the sound volume decrease and sound quality degradation can be suppressed. As a result, sounding body 103D can certainly announce an approach of the mobile device to a pedestrian or the like. As separate components, both a horn and a loudspeaker do not need to be attached to the mobile device. Therefore, downsizing, weight reduction, and low price can be simultaneously achieved.

Figure 9:
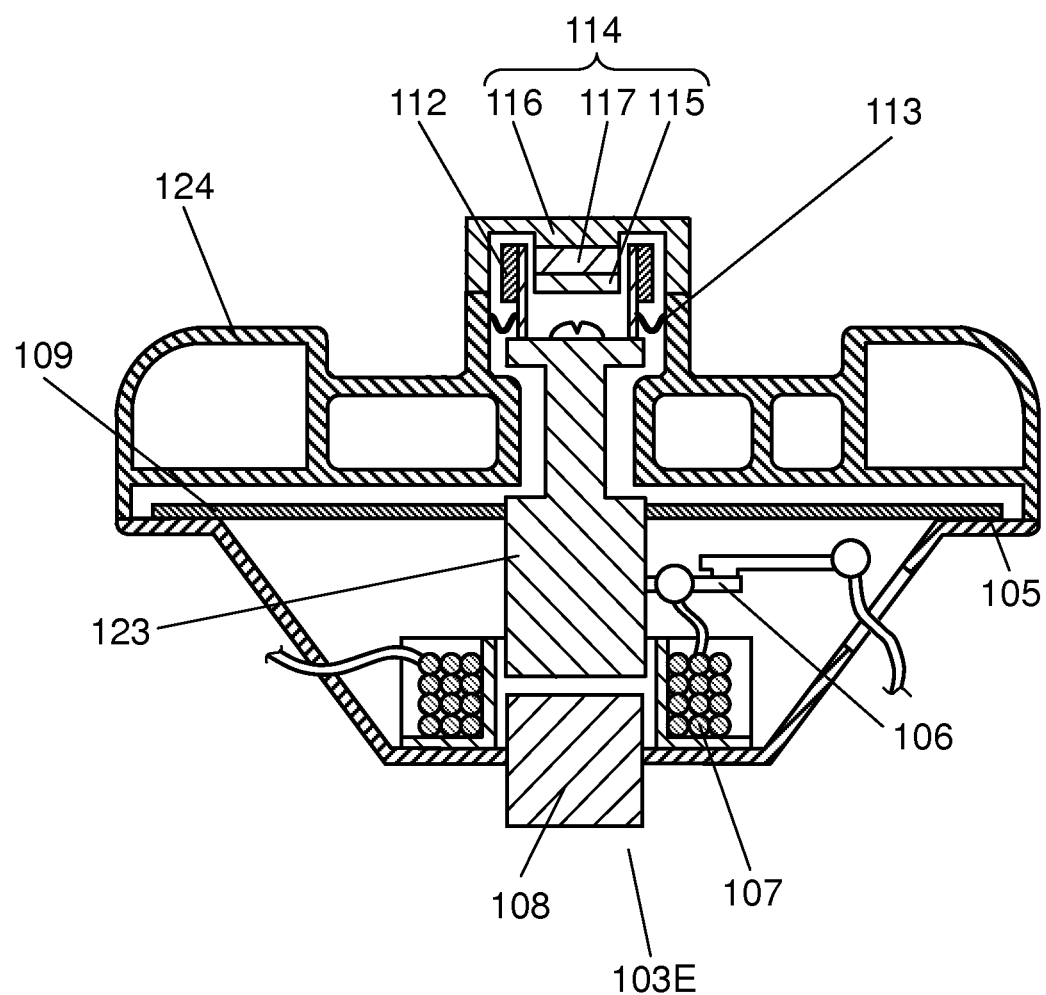
FIG. 9 is a sectional view of another sounding body in accordance with the second exemplary embodiment of the present disclosure.

Another example of sounding body 103 shown in FIG. 7 is described with reference to FIG. 9. FIG. 9 is a sectional view of sounding body 103E in accordance with the present exemplary embodiment. Sounding body 103E is different from sounding body 103D in that shaft 123 is used instead of shaft 110 and resonance tube 124 is used instead of resonator 111. The basic configuration except these points is similar to that of sounding body 103D.

Shaft 123, similarly to shaft 110, is bonded to and held by the central part of diaphragm 109, and is driven vertically (in the drawing) by a magnetic force generated in pole 108.

Resonance tube 124 is disposed on the upside of housing 105, and resonates with the sounds produced from diaphragm 109 and voice coil 112 and emits them. Similarly to housing 105, resonance tube 124 is made of metal or resin.

Similarly to sounding body 103D, magnetic coil 107, pole 108, housing 105, shaft 123, and diaphragm 109 constitute a horn section for giving a honk. On the other hand, magnetic circuit 114, voice coil 112, diaphragm 109, and shaft 123 constitute a loudspeaker section for producing a sound for announcing an approach of the mobile device.

Magnetic circuit 114 faces diaphragm 109 or shaft 123. In other words, magnetic circuit 114 is disposed so as to face the horn section and is bonded to a part of resonance tube 124 disposed on housing 105. A central part of suspension 113 holds voice coil 112, and the rim of suspension 113 is bonded to resonance tube 124.

An operation of sounding body 103E that is formed of the horn section and the loudspeaker section in this manner is described. In the horn section, when a horn signal is sent from horn signal generating section 104 shown in FIG. 7 to magnetic coil 107, diaphragm 109 vibrates vertically (in the drawing) to produce a sound. This operation is similar to that in sounding body 103D. Resonance tube 124 resonates with this sound to emit a sound to the outside, thereby giving a honk at a large sound volume.

Next, an operation as the loudspeaker section is described. A signal output from sound source 101 of FIG. 7 is power-amplified by amplifier 102, and is input to voice coil 112. In response to this signal, voice coil 112 is vibrated vertically (in the drawing) by the magnetic force of magnetic circuit 114 to produce a sound. Diaphragm 109 that is connected to voice coil 112 via shaft 123 bonded to the tip of voice coil 112 is also vibrated vertically (in the drawing) by the magnetic force of magnetic circuit 114 to produce a sound. Resonance tube 124 resonates with this sound to emit the sound to the outside, thereby increasing the reproduction level. Thus, resonance tube 124 is disposed at a position where it can resonate with the vibration sound of diaphragm 109 and the vibration sound of voice coil 112.

Thus, sounding body 103E produces an effect similar to that of sounding body 103D.

Figure 10:
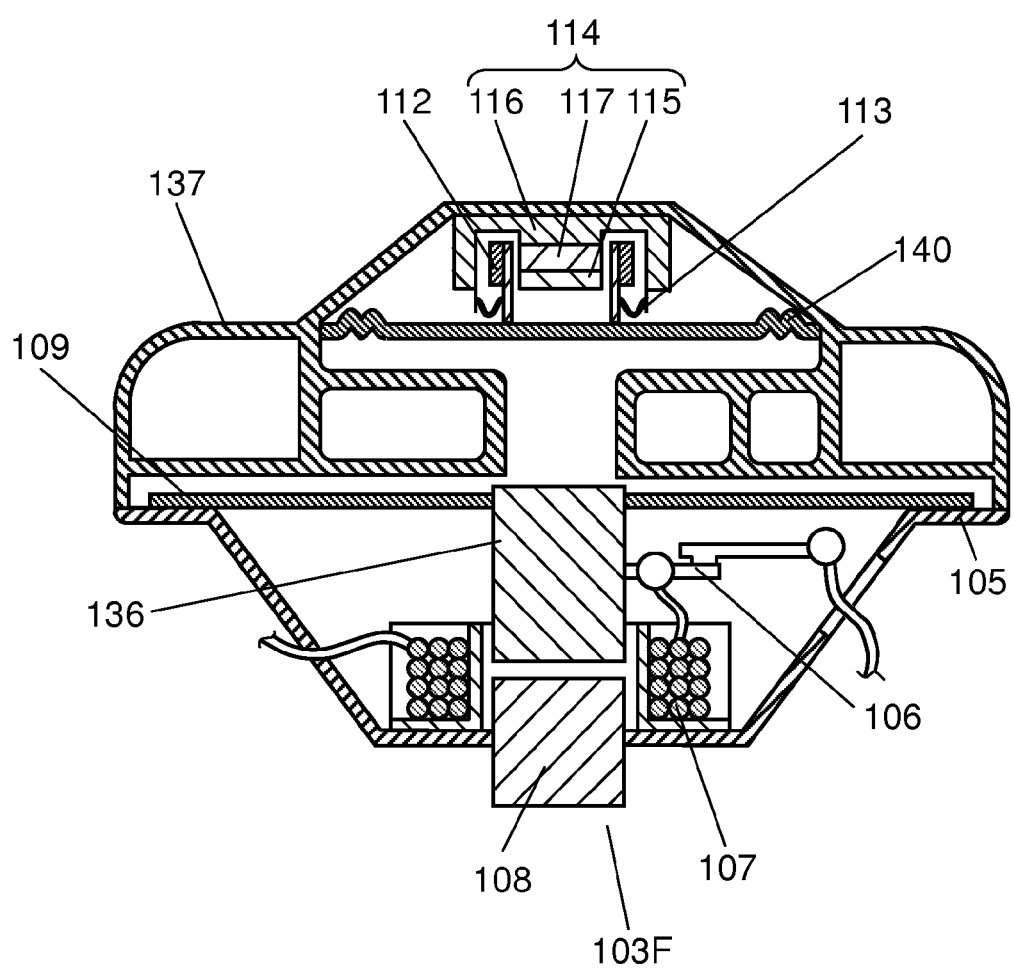
FIG. 10 is a sectional view of yet another sounding body in accordance with the second exemplary embodiment of the present disclosure.

Next, yet another example of sounding body 103 shown in FIG. 7 is described with reference to FIG. 10. FIG. 10 is a sectional view of sounding body 103F in accordance with the present exemplary embodiment. Sounding body 103F is different from sounding body 103E in that shaft 136 is used instead of shaft 123 and diaphragm 140 bonded to voice coil 112 is disposed. Instead of resonance tube 124, resonance tube 137 is employed. Resonance tube 137 is disposed at a position where it can resonate with the vibration sound of diaphragm 109 as a first diaphragm and the vibration sound of diaphragm 140 as a second diaphragm. The basic configuration except these points is similar to that of sounding body 103D.

Similarly to shaft 123 of FIG. 9, shaft 136 is bonded to and held by the central part of diaphragm 109, and is driven vertically (in the drawing) by a magnetic force generated in pole 108. However, shaft 136 is not bonded to voice coil 112.

Resonance tube 137 is disposed on the upside of housing 105. Housing 105 and resonance tube 137 are made of metal or resin.

Similarly to sounding body 103E, magnetic coil 107, pole 108, housing 105, shaft 136, and diaphragm 109 constitute a horn section for giving a honk. On the other hand, magnetic circuit 114, voice coil 112, and diaphragm 140 constitute a loudspeaker section that produces a sound for announcing an approach of the mobile device.

Magnetic circuit 114 faces diaphragm 109 or shaft 136. In other words, magnetic circuit 114 is disposed so as to face the horn section and is bonded to a part of resonance tube 137 disposed on housing 105. A central part of diaphragm 140 is bonded to the tip of voice coil 112, and the rim of diaphragm 140 is bonded to resonance tube 137. A central part of suspension 113 holds voice coil 112, and the rim of suspension 113 is bonded to magnetic circuit 114.

An operation of sounding body 103F that is formed of the horn section and the loudspeaker section in this manner is described. In the horn section, when a horn signal is sent from horn signal generating section 104 shown in FIG. 7 to magnetic coil 107, diaphragm 109 vibrates vertically (in the drawing) to produce a sound. This operation is similar to that in sounding body 103E. Resonance tube 137 resonates with this sound to emit a sound to the outside, thereby giving a honk at a large sound volume.

Next, an operation as the loudspeaker section is described. A signal output from sound source 101 shown in FIG. 7 is power-amplified by amplifier 102, and is input to voice coil 112. In response to this signal, voice coil 112 and diaphragm 140 are vibrated vertically (in the drawing) by the magnetic force of magnetic circuit 114 to produce a sound. Resonance tube 137 resonates with this sound to emit a sound to the outside, thereby increasing the reproduction level.

Thus, sounding body 103F produces an effect similar to that of sounding bodies 103D and 103E.

In sounding bodies 103D to 103F, the horn section mounted on the front and the loudspeaker section producing a sound for announcing an approach of the mobile device share diaphragm 109 and resonator 111 or resonance tube 124 or 137, and are integrated. The horn section is designed as a component that is originally located on the front of the mobile device. Therefore, the environmental resistance such as quality or reliability is secured in consideration of the wind pressure when the mobile device travels at a high speed and the water droplets when the mobile device travels in the rain. Therefore, the environmental resistance is extremely higher than that of a conventional loudspeaker that is mounted deeply in a central part in the engine compartment and produces a sound toward the inside of the engine compartment of the mobile device.

In the case where a conventional loudspeaker that has a diaphragm made of paper or thin resin is mounted on the front of the mobile device so that the diaphragm points ahead of the mobile device, the environmental resistance such as quality and reliability cannot be secured. When the conventional loudspeaker is mounted as discussed above, the loudspeaker can be damaged by the wind pressure when the mobile device travels at a high speed, and by the water droplets when the mobile device travels in the rain.

In sounding bodies 103D to 103F, magnetic circuit 114 is disposed so that the magnetic gap faces the horn section. In other words, magnetic circuit 114 is disposed so as to point ahead of the mobile device. Magnetic circuit 114 is made of a metal body of a high environmental resistance against the wind pressure during the traveling at a high speed and the water droplets during the traveling in the rain. Furthermore, housing 105 made of a metal body or resin can block the influence of the wind pressure during the traveling of the mobile device at a high speed and the water droplets during the traveling in the rain. In other words, a vibrating component of the loudspeaker section of a low environmental resistance can be accommodated in housing 105. Therefore, the loudspeaker section is not directly affected by the wind pressure during the traveling at a high speed, and by the water droplets during the traveling in the rain.

Also from such a viewpoint, sounding bodies 103D to 103F in which the horn section located on the front of the mobile device and the loudspeaker section are integrated are extremely effective.

Thus, sounding bodies 103D to 103F are mounted in the front part of the mobile device in the outer periphery thereof while the environmental resistance such as quality and reliability is secured, and emit a sound toward the outside of the mobile device. Thanks to this configuration, the mobile device can certainly call attention of a pedestrian or the like at a sufficient sound volume and with a high sound quality, and can secure the extremely high safety.

THIRD EXEMPLARY EMBODIMENT

Figure 24:
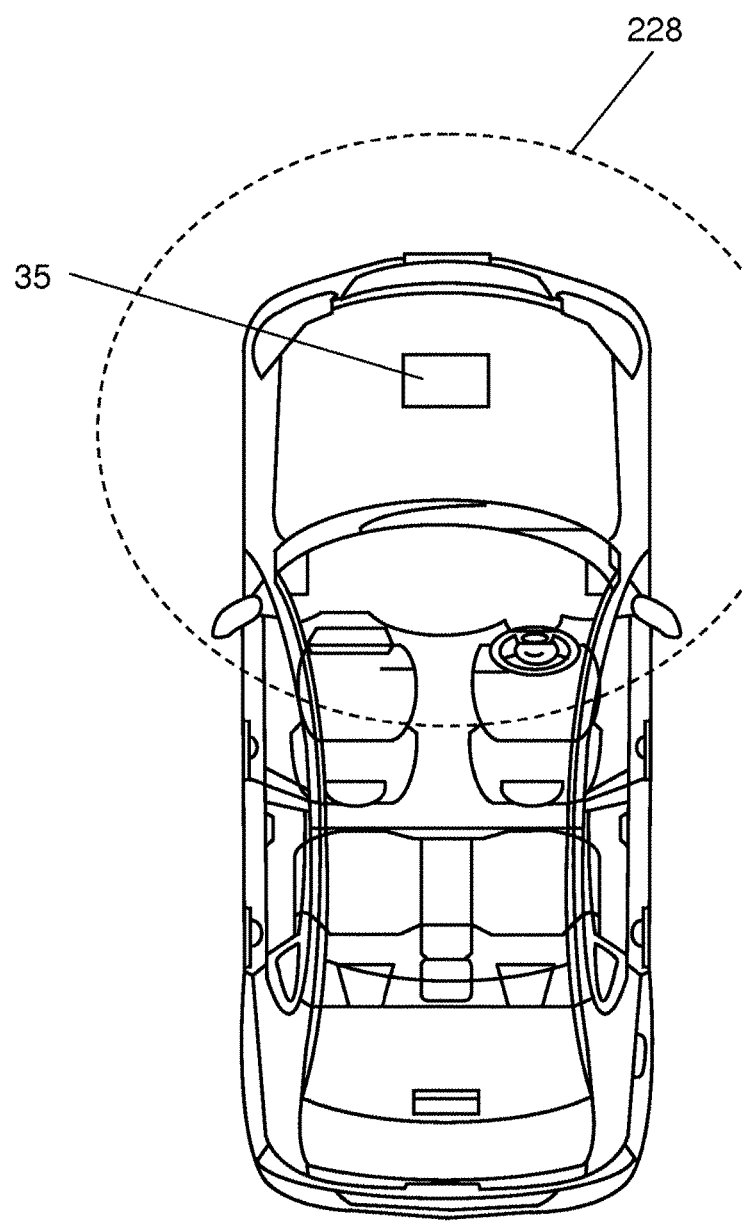
FIG. 24 is an audio output distribution chart showing the distribution of an audio output of the conventional audio reproduction device.

Prior to the description of a third exemplary embodiment of the present disclosure, additional problems of the conventional audio reproduction device is described with reference to FIG. 24. FIG. 24 is an audio output distribution chart showing the distribution of an audio output of the conventional audio reproduction device. Substantially circular region 228 shows the distribution of the audio output capable of being reproduced by the conventional audio reproduction device. As is clear from region 228, the conventional audio reproduction device can produce, from loudspeaker 35, some sound volume in the forward direction of a mobile device, but cannot perform audio reproduction of a sufficient output in the side direction of the mobile device.

In other words, sides of the mobile device are not provided with an opening for emitting a sound, so that the audio reproduction of a sufficient output cannot be performed. Therefore, when the mobile device turns to the right or left—an accident is apt to happen at this time—, an approach of the mobile device cannot be certainly announced to a pedestrian or the like walking beside or ahead of the mobile device.

Figure 11:
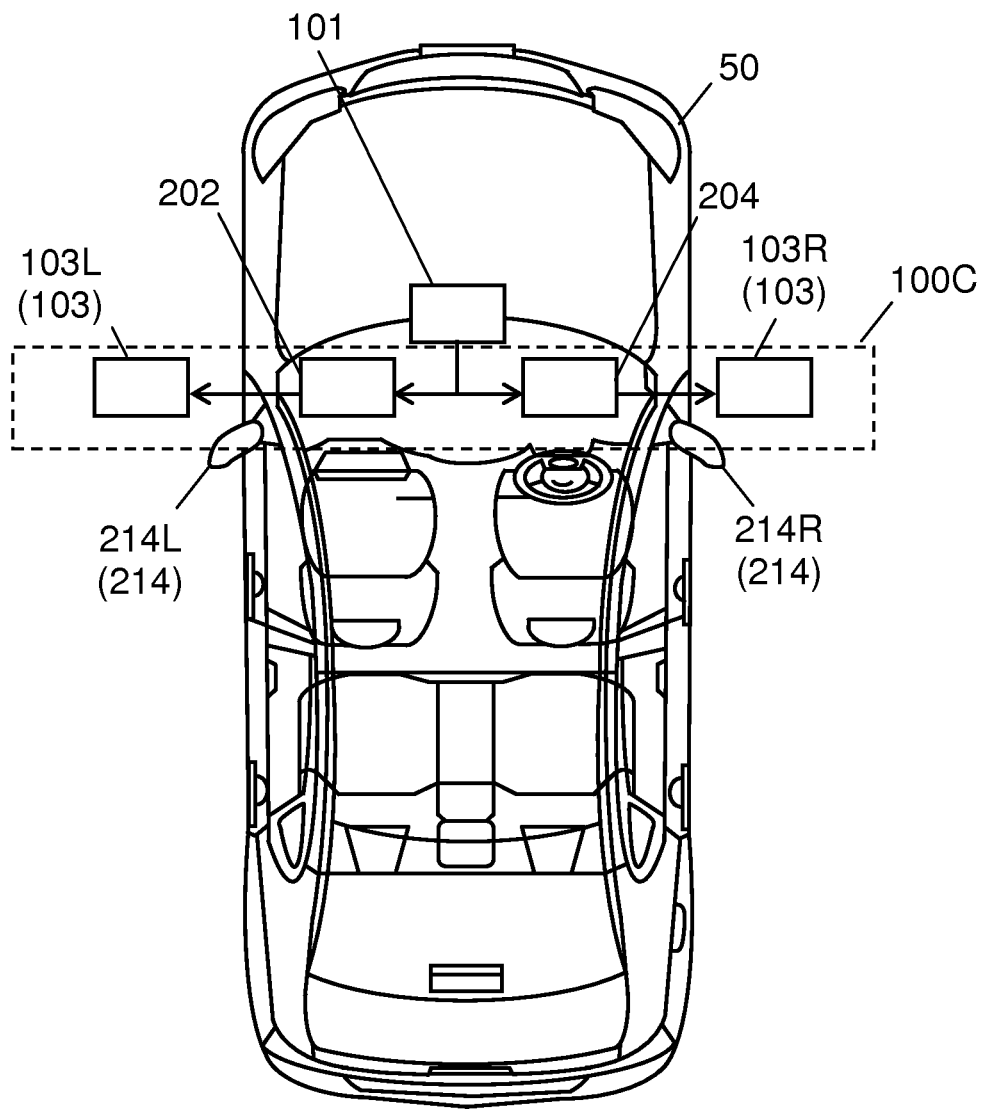
FIG. 11 is a block diagram showing a configuration of an audio reproduction device in accordance with a third exemplary embodiment of the present disclosure.

Hereinafter, an audio reproduction device of the present exemplary embodiment is described with reference to FIG. 11 to FIG. 13. FIG. 11 is a block diagram showing a configuration of the audio reproduction device in accordance with the present exemplary embodiment.

Audio reproduction device 100C of the present exemplary embodiment is different from audio reproduction device 100A shown in FIG. 1C in that sounding body 103 includes first sounding section 103L and second sounding section 103R and the amplifier includes first amplifier 202 and second amplifier 204 that divide a sound source signal output from sound source 101 into signals and amplify each signal. First sounding section 103L and second sounding section 103R form mirror section 214L and mirror section 214R mounted on sides of main body 50 of the mobile device, respectively. The configuration except these points is similar to that in the first exemplary embodiment.

Sound source 101 possesses a sound source signal which is a signal of a pseudo engine sound or the like for announcing an approach of the mobile device, similarly to the first and second exemplary embodiments. A sound is reproduced from first sounding section 103L via first amplifier 202 based on a sound source signal output from sound source 101. Similarly, a sound is reproduced from second sounding section 103R via second amplifier 204 based on a sound source signal output from sound source 101. As discussed above, first sounding section 103L and second sounding section 103R form mirror section 214L and mirror section 214R mounted on the left and right sides of the mobile device, respectively.

In this configuration, a sound for announcing an approach of the mobile device is reproduced in the forward and side directions of the mobile device from left-side first sounding section 103L and right-side second sounding section 103R. Therefore, comparing with the conventional case where a loudspeaker is disposed in the engine compartment, the mobile device can widely reproduce a sound from a position close to the ears of a pedestrian. Therefore, an approach of the mobile device can be certainly announced to a pedestrian or the like walking ahead of or beside the mobile device at a sufficient sound volume. As a result, extremely high safety can be secured also when the mobile device turns to the right or left—an accident is apt to happen at this time.

Figure 12:
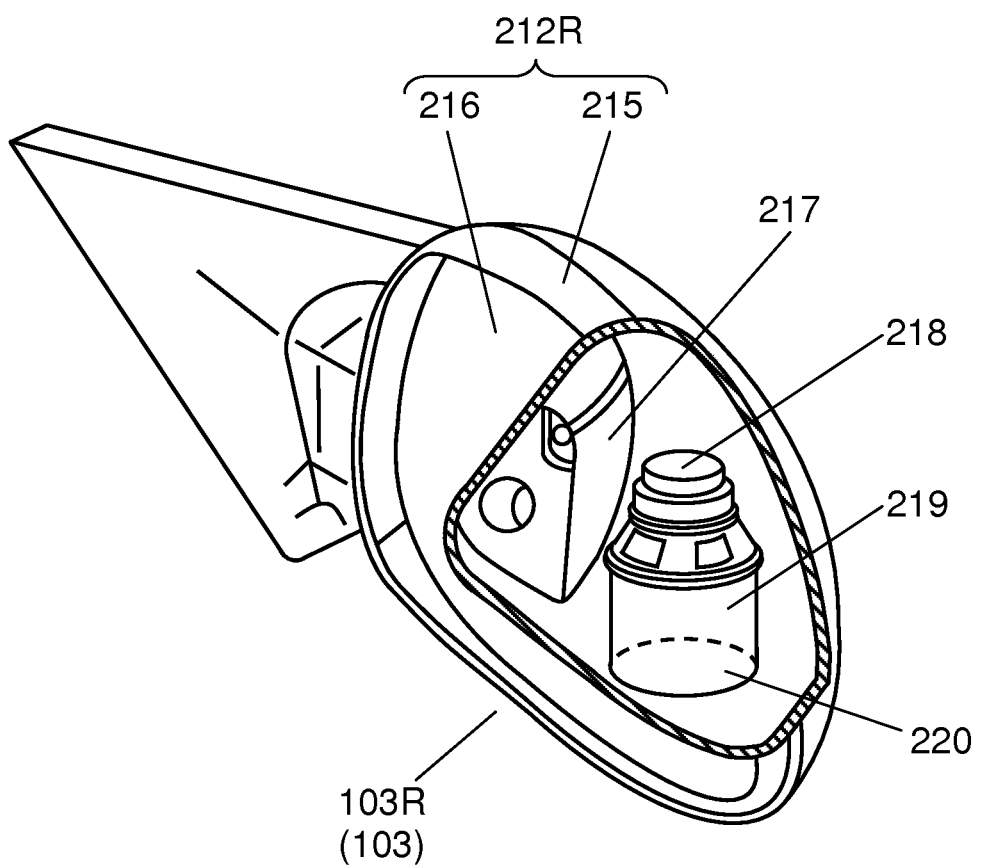
FIG. 12 is a partially cutaway perspective view of a second sounding section of a sounding body in accordance with the third exemplary embodiment of the present disclosure.

Next, the configuration of second sounding section 103R, among first sounding section 103L and second sounding section 103R, is described as a representative example with reference to FIG. 12. The configuration of first sounding section 103L is left-right reverse to that of second sounding section 103R, so that the descriptions are omitted. FIG. 12 is a partially cutaway perspective view of second sounding section 103R of sounding body 103 forming audio reproduction device 100C shown in FIG. 11. Here, the case where second sounding section 103R has a configuration of a door mirror is described as an example.

Second sounding section 103R includes mirror housing 215, mirror 216, and loudspeaker 218. Mirror housing 215 is attached on one (right side) of both sides of the mobile device. The bottom surface of mirror housing 215 is provided with audio opening 220 for emitting a reproduced sound by loudspeaker 218 to the outside. Mirror 216 is attached on mirror housing 215.

Loudspeaker 218 is attached in a part of the space in mirror housing 215. Specifically, loudspeaker 218 is communicated with audio opening 220, and is attached to sound tube 219 for guiding the reproduced sound of loudspeaker 218. Loudspeaker 218 receives a sound source signal amplified by second amplifier 204 shown in FIG. 11. Mirror housing 215 and mirror 216 constitute mirror section 214R mounted on the side of the mobile device of FIG. 11. Mirror section 214R may have motor section 217 for driving mirror housing 215 and mirror 216.

Disposing sound tube 219 can eliminate the phase interference between the front and rear of loudspeaker 218. Furthermore, the reproduced sound of loudspeaker 218 can be efficiently emitted to the outside with a high sound quality. The degrees of freedom in disposing loudspeaker 218 can be significantly increased. Additionally, loudspeaker 218 can be protected from rain and wind coming through audio opening 220.

By forming audio opening 220 in the bottom surface of mirror housing 215, various effects are produced. As one effect, the reproduced sound of loudspeaker 218 is emitted downward (toward the ground). The reproduced sound of loudspeaker 218 is therefore reflected on the ground and is diffused. Thus, the output of the reproduced sound can be extended to a wider range. As a second effect, the possibility that rain and wind come through audio opening 220 can be reduced, and loudspeaker 218 can be protected from the rain and wind.

The above-mentioned description has shown an example where a door mirror of the mobile device is used as second sounding section 103R. However, a fender mirror may be employed. Also in this case, a similar effect can be produced.

Figure 13:
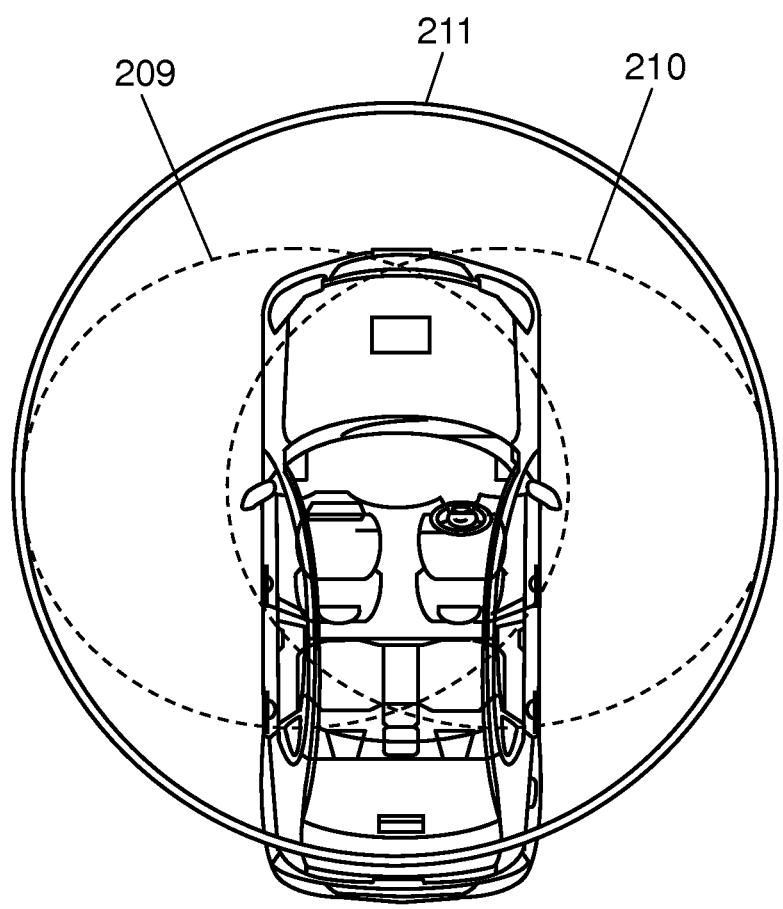
FIG. 13 is an audio output distribution chart showing the distribution of an audio output of the audio reproduction device shown in FIG. 11.

FIG. 13 shows the distribution of the audio output of audio reproduction device 100C having such a configuration. Region 209 shows the audio output distribution from left-side first sounding section 103L, and region 210 shows the audio output distribution from right-side second sounding section 103R. Region 211 shows the composite audio output distribution from first sounding section 103L and second sounding section 103R. As is clear from FIG. 13, the audio output in the side direction of the mobile device is extended. Here, this audio output is difficult to be obtained by the conventional audio reproduction device.

Thus, by reproducing sounds from first sounding section 103L and second sounding section 103R, higher safety is obtained. In other words, comparing with the conventional audio reproduction device, the audio output in the side direction of the mobile device is sufficiently extended and a higher safety can be secured.

Figure 14:
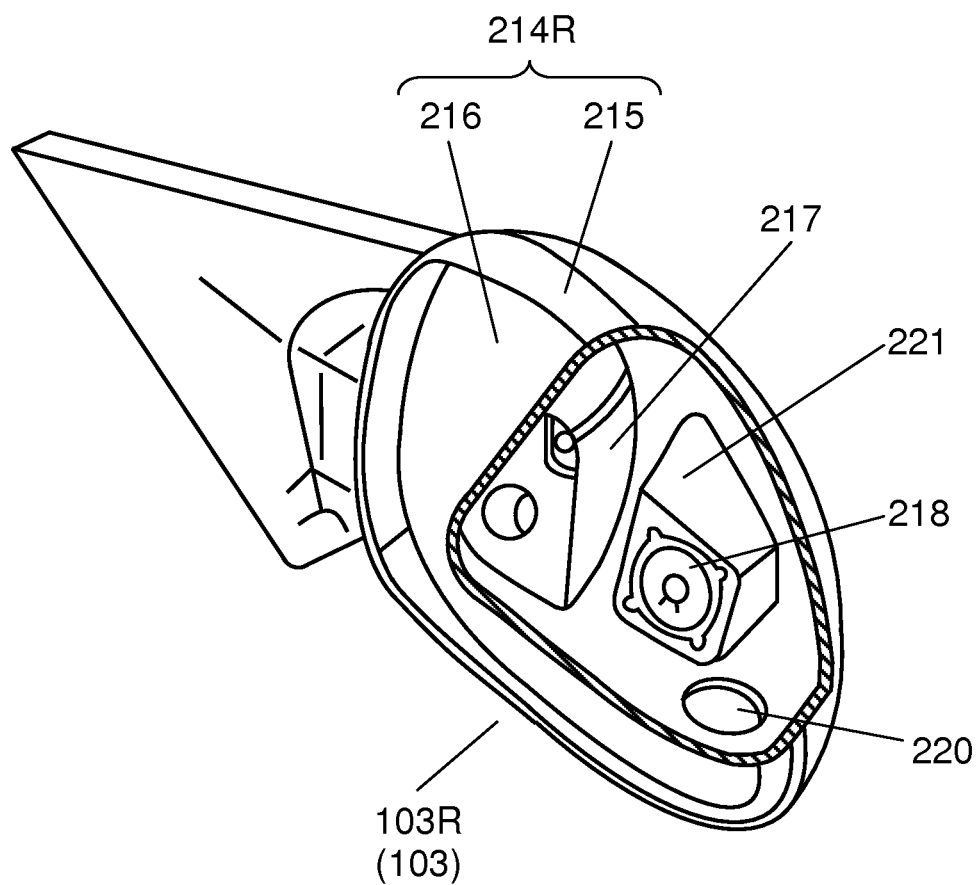
FIG. 14 is a partially cutaway perspective view of another second sounding section of the sounding body in accordance with the third exemplary embodiment of the present disclosure.

Next, another configuration of second sounding section 103R forming a sounding body is described with reference to FIG. 14. The configuration of first sounding section 103L is simply left-right reverse to that of second sounding section 103R, so that the descriptions are omitted. FIG. 14 is a partially cutaway perspective view of another second sounding section 103R of the sounding body forming the audio reproduction device of FIG. 11.

Second sounding section 103R shown in FIG. 14 does not include sound tube 219 shown in FIG. 12, but includes baffle plate 221 instead of it. Loudspeaker 218 is attached in mirror housing 215 via baffle plate 221. In other words, baffle plate 221 is interposed between loudspeaker 218 and mirror housing 215. Baffle plate 221, after it reduces the phase interference between the front and rear of loudspeaker 218, emits a reproduced sound to the outside through audio opening 220 disposed in the bottom surface of mirror housing 215. Also in this configuration, the sound can be reproduced with a high sound quality.

Figure 15:
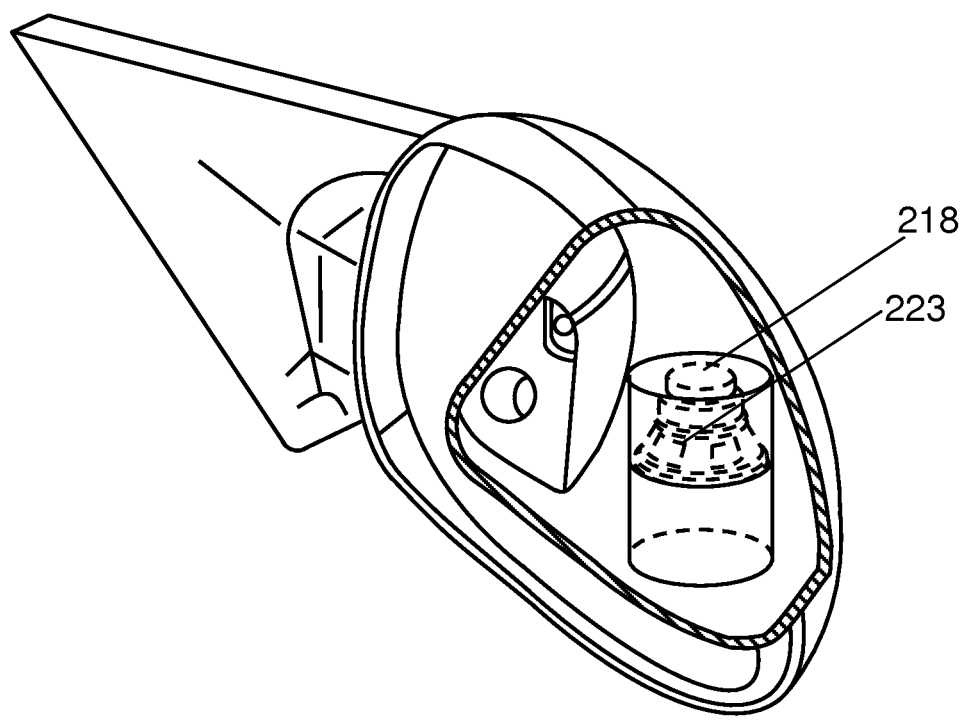
FIG. 15 is a partially cutaway perspective view showing the state where a dustproof net is added to the second sounding section shown in FIG. 12.

Next, a configuration where dustproof net 223 for protecting loudspeaker 218 is attached on loudspeaker 218 is described. FIG. 15 is a partially cutaway perspective view showing the state where dustproof net 223 is added to second sounding section 103R shown in FIG. 12. Thus, even if rain, wind, or dust comes into mirror housing 215, loudspeaker 218 can be protected from the rain, wind or dust. Therefore, the reliability is improved.

Figure 16:
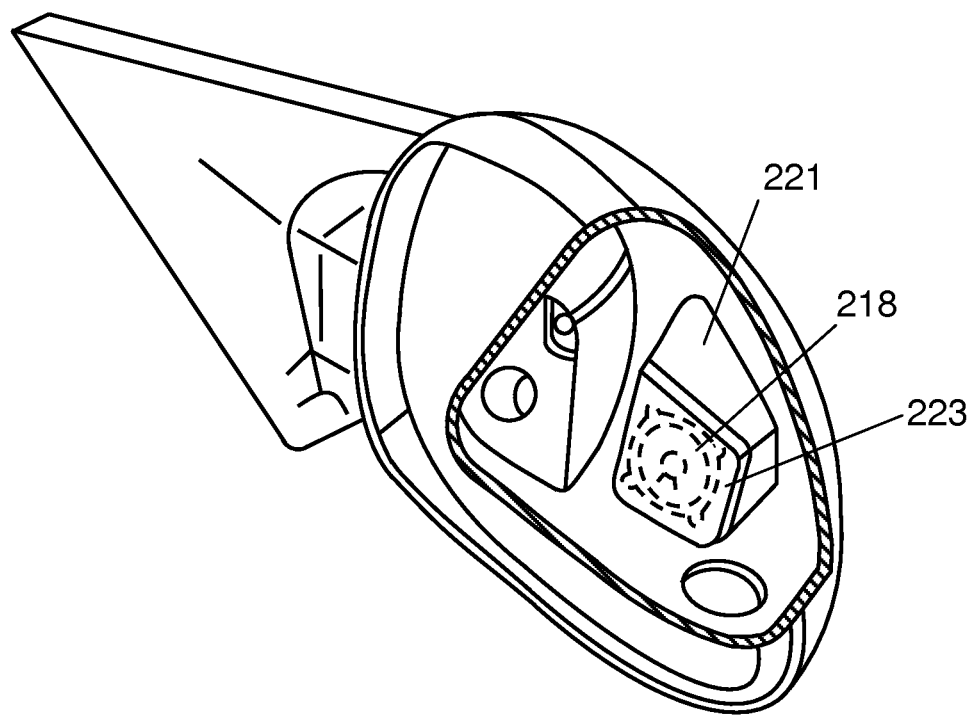
FIG. 16 is a partially cutaway perspective view showing the state where a dustproof net is added to the second sounding section shown in FIG. 14.

FIG. 16 is a partially cutaway perspective view showing the state where dustproof net 223 is added to second sounding section 103R shown in FIG. 14. Dustproof net 223 protects loudspeaker 218 and baffle plate 221. Thus, loudspeaker 218 can be protected from rain, wind or dust. Therefore, the reliability is further improved.

Dustproof net 223 may be disposed so as to protect sounding body 103 of another exemplary embodiment in addition to loudspeaker 218 attached in mirror housing 215. Thanks to this configuration, similarly, rain, wind or dust can be prevented from coming and the reliability is further improved.

Figure 17:
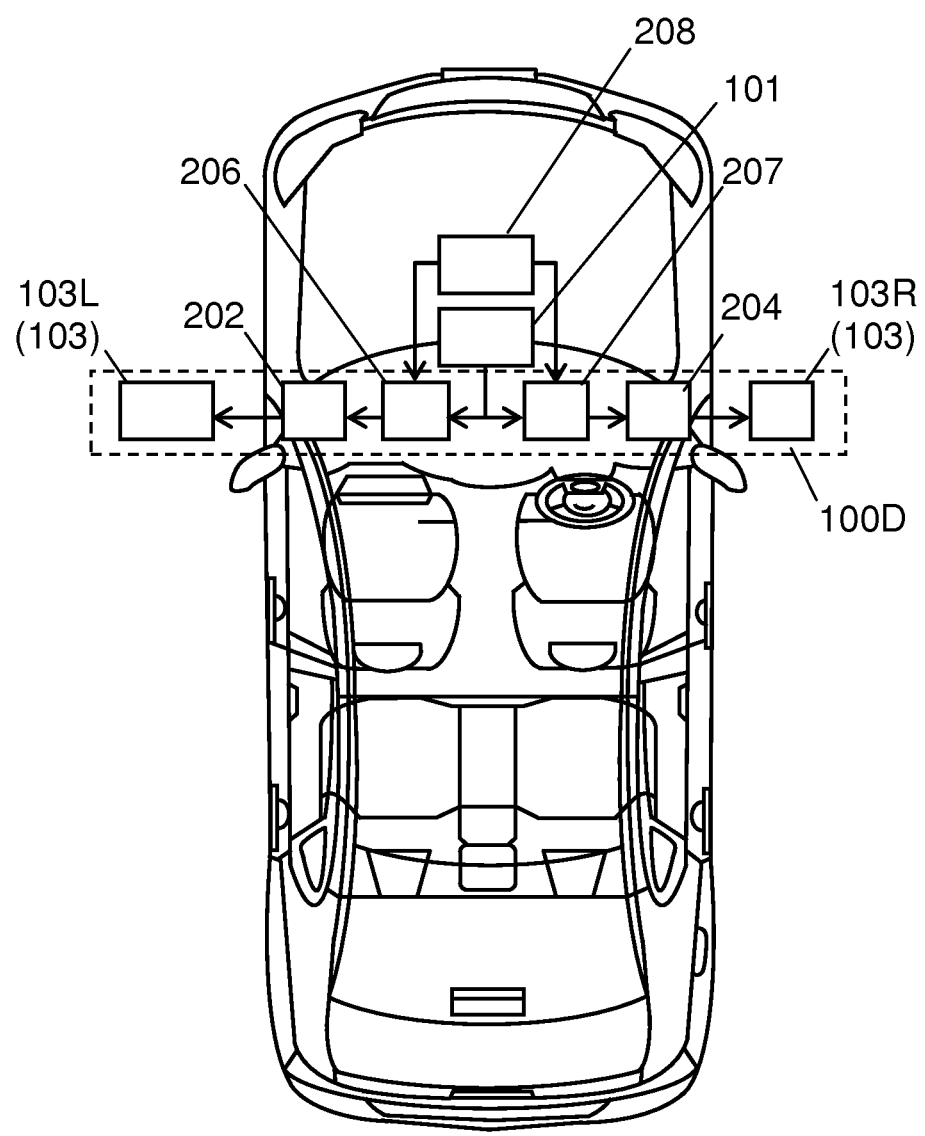
FIG. 17 is a block diagram showing a configuration of another audio reproduction device in accordance with the third exemplary embodiment of the present disclosure.

Next, a configuration where the sound volumes of first sounding section 103L and second sounding section 103R are controlled in conjunction with a turn signal of the mobile device is described. FIG. 17 is a block diagram showing a configuration of another audio reproduction device in accordance with the present exemplary embodiment. In this configuration, first control section 206, second control section 207, and turn signal generating section 208 are added to the configuration shown in FIG. 11. In other words, audio reproduction device 100D includes first control section 206 and second control section 207 in addition to audio reproduction device 100C.

Turn signal generating section 208 mounted in the mobile device outputs a turn signal when the mobile device turns right or left. Turn signal generating section 208 can be formed of an angular velocity sensor, for example. Alternatively, turn signal generating section 208 may have a configuration where it generates a turn signal in response to the detection of the rotation direction of a steering wheel operated by a driver or in conjunction with a direction indicator.

First control section 206 controls first amplifier 202 in conjunction with the turn signal. Second control section 207 controls second amplifier 204 in conjunction with the turn signal. First control section 206 is disposed between sound source 101 and first amplifier 202, and second control section 207 is disposed between sound source 101 and second amplifier 204, for example.

The turn signal is input to first control section 206 when the mobile device turns left, and is input to second control section 207 when the mobile device turns right. When the turn signal is input to first control section 206, it controls first amplifier 202 so that the sound volume level is increased by a certain level. Similarly, when the turn signal is input to second control section 207, it controls second amplifier 204 so that the sound volume level is increased by a certain level. When a turn signal is not input, first control section 206 and second control section 207 control first amplifier 202 and second amplifier 204 so that the sound volume level becomes a normal level, respectively.

Figure 18:
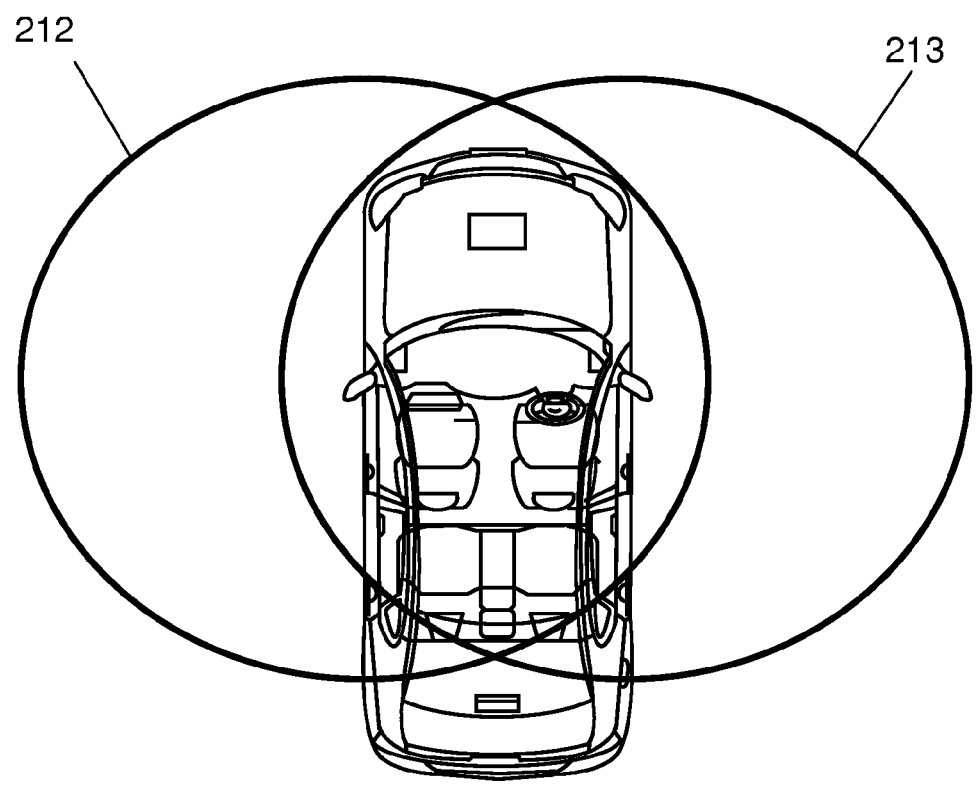
FIG. 18 is an audio output distribution chart showing the distribution of an audio output of the audio reproduction device shown in FIG. 17.

FIG. 18 is an audio output distribution chart showing the distribution of an audio output of the audio reproduction device shown in FIG. 17. Region 212 shows the audio output distribution of first sounding section 103L when a turn signal indicating the left turn is input. Region 213 shows the audio output distribution of second sounding section 103R when a turn signal indicating the right turn is input. As is clear from FIG. 18, when the mobile device turns left or right, the reproduced sound from first sounding section 103L or second sounding section 103R corresponding to the turning direction increases in conjunction with the turn signal, and a pedestrian or the like more easily senses the approach of the mobile device. In other words, audio reproduction device 100D can certainly call attention of a pedestrian or the like at a sufficient sound volume, and can secure the extremely high safety.

Figure 19:
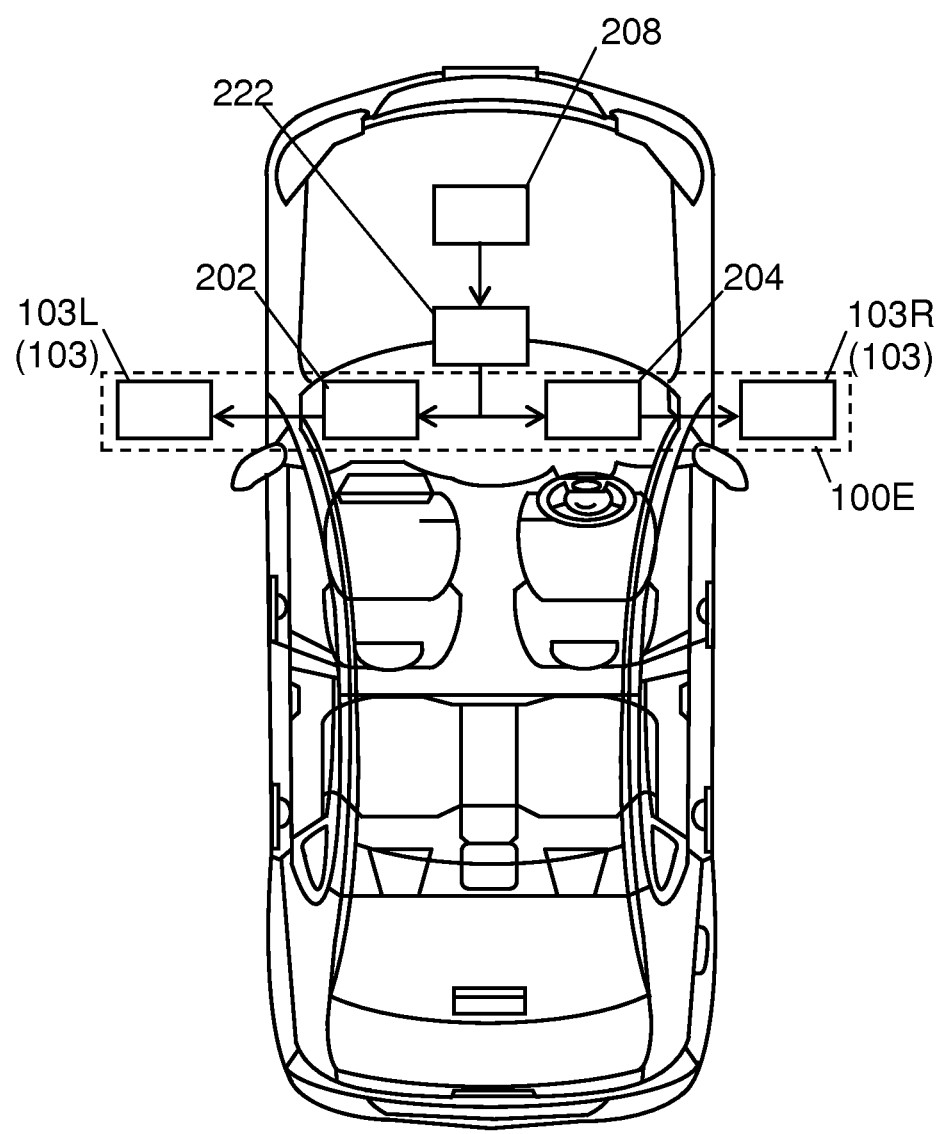
FIG. 19 is a block diagram showing a configuration of yet another audio reproduction device in accordance with the third exemplary embodiment of the present disclosure.

Furthermore, when the mobile device turns left or right, the reproduced sound in the turning direction may be switched from a pseudo engine sound to a warning sound. A configuration allowing such switching is described with reference to FIG. 19. FIG. 19 is a block diagram showing a configuration of yet another audio reproduction device in accordance with the present exemplary embodiment.

In this configuration, sound source 222 possesses at least two types of sound source signals. In other words, sound source 222 generates at least two different types of sound source signals. A sound source signal output from sound source 222 is amplified by first amplifier 202, and first sounding section 103L reproduces a sound based on the amplified sound source signal. Similarly, a sound source signal output from sound source 222 is amplified by second amplifier 204, and second sounding section 103R reproduces a sound based on the amplified sound source signal.

Turn signal generating section 208 is connected to sound source 222. Sound source 222 selects one of the plurality of sound source signals in response to the turn signal, and outputs the selected sound source signal to one of first amplifier 202 and second amplifier 204 in response to the turn signal. In other words, when the turn signal is input, sound source 222 outputs a sound source signal such as a warning sound to left-side first amplifier 202 or right-side second amplifier 204 corresponding to the turning direction of the mobile device. Here, the warning sound is different from a pseudo engine sound or the like as a normal sound for announcing an approach of the mobile device. This warning sound may be an intermittent sound of sine wave heavily used as a normal warning sound, or a message by music or voice. Thanks to this configuration, call attention of a pedestrian or the like walking in the turning direction can be further enhanced.

The audio reproduction device having such a configuration not only has an effect produced by above-mentioned audio reproduction device 100D, but also can further enhance the call attention of a pedestrian or the like walking in the turning direction of the mobile device and can secure higher safety.

Figure 20:
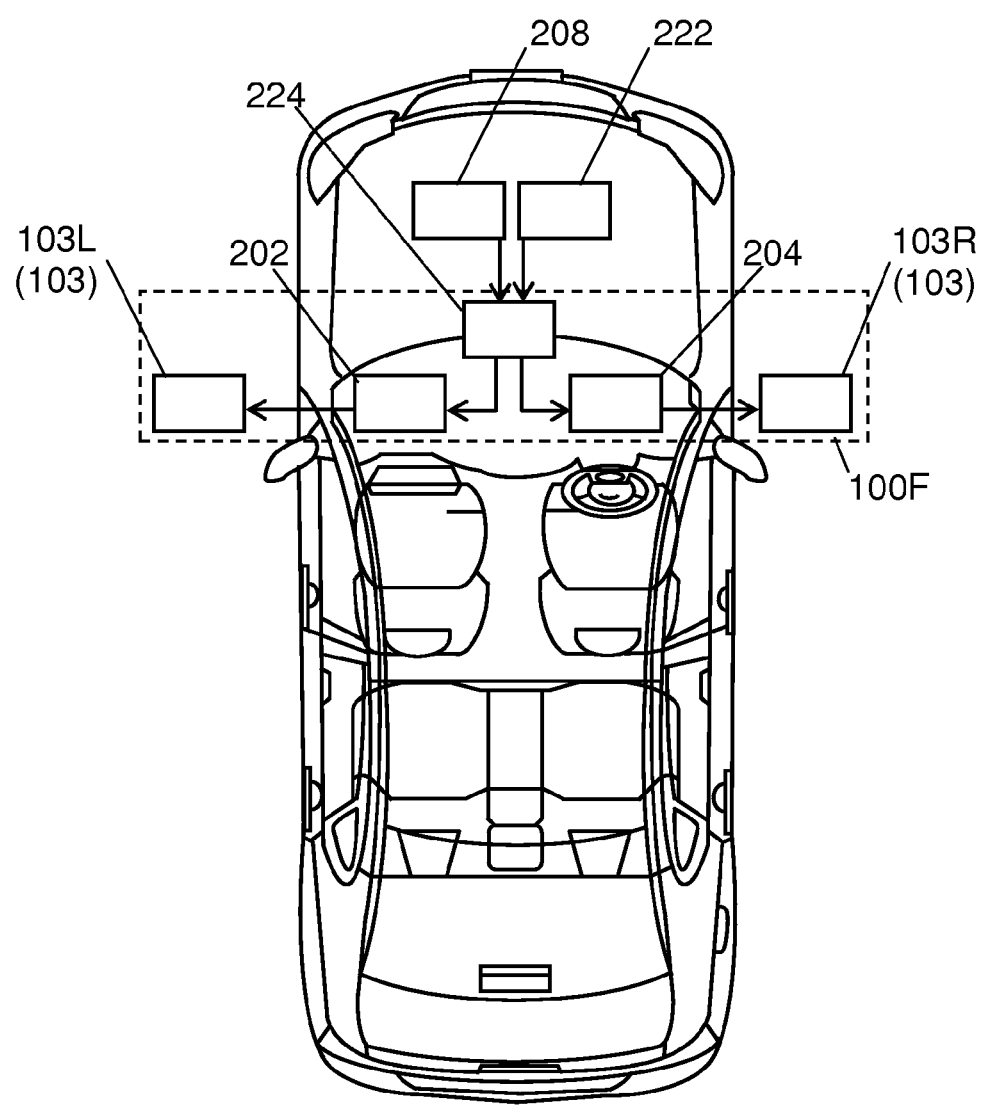
FIG. 20 is a block diagram showing a configuration of still another audio reproduction device in accordance with the third exemplary embodiment of the present disclosure.

Instead of the method in which sound source 222 outputs a selected sound source signal to one of first amplifier 202 and second amplifier 204 in response to the turn signal, selecting section 224 may be disposed as shown in FIG. 20. FIG. 20 is a block diagram showing a configuration of still another audio reproduction device in accordance with the present exemplary embodiment.

Selecting section 224 selects one of the plurality of sound source signals output from sound source 222 in response to the turn signal, and outputs the selected sound source signal to one of first amplifier 202 and second amplifier 204 in response to the turn signal. Selecting section 224 may be included in audio reproduction device 100F, or, similarly to turn signal generating section 208, does not need to be included in audio reproduction device 100F. Also when selecting section 224 is employed, an effect similar to that in audio reproduction device 100E is produced.

The configurations described with reference to FIG. 11, FIG. 17, FIG. 19, and FIG. 20 are not limited to the configuration employing first sounding section 103L and second sounding section 103R that are formed integrally with mirror section 214. In other words, also when emblem 2B is disposed on each of both sides of main body 50 and the configuration of the first exemplary embodiment is employed, a similar effect can be produced.

As described above, an audio reproduction device of the present disclosure is useful for an electric automobile or hybrid car required to appropriately announce an approach of the mobile device to a pedestrian or the like.

What is claimed is:

1. A sounding body included in an audio reproduction device for use with a mobile device, the sounding body comprising:
   a vibrating body;
   a voice coil coupled to a rear surface of the vibrating body directly;
   a magnetic circuit having a magnetic gap into which the voice coil is inserted; and
   a frame including a bottom coupled to the magnetic circuit and an upper part supporting the vibrating body with respect to the magnetic circuit, and
   a resin section coupled to an outer peripheral surface of the vibrating body and an inner peripheral surface of an opening of an exterior member of the mobile device such that the resin section attaches the vibrating body to the exterior member, and being more apt to deform than the vibrating body, wherein the vibrating body includes an emblem portion which serves as an emblem of the mobile device, and the emblem portion is mounted on at least one of a front surface, side surface, and rear surface of the exterior member of the mobile device, the upper part of the frame is fixed to a rear surface of the exterior member of the mobile device, the emblem portion of the vibrating body is located at an outer side of the upper part of the frame.

2. An audio reproduction device for use with a mobile device, the audio reproduction device comprising:
   an amplifier configured to amplify a sound source signal; and
   the sounding body of claim 1 further configured to reproduce a signal amplified by the amplifier.

3. A mobile device comprising:
   an audio reproduction device including:
      an amplifier configured to amplify a sound source signal; and
      the sounding body of claim 1 further configured to reproduce a signal amplified by the amplifier;
   a sound source configured to supply the sound source signal to the amplifier of the audio reproduction device; and
   a main body having the audio reproduction device and the sound source.

4. The sounding body according to claim 1,
   wherein an outer surface of the exterior member of the mobile device and an outer face of the emblem portion are not covered with the resin section.

5. A sounding body included in an audio reproduction device for use with a mobile device, the sounding body comprising:
   a vibrating body;
   a voice coil coupled to a rear surface of the vibrating body directly;
   a magnetic circuit having a magnetic gap into which the voice coil is inserted; and
   a frame including a bottom coupled to the magnetic circuit and an upper part supporting the vibrating body with respect to the magnetic circuit, and
   an elastic body coupled to an outer peripheral surface of the vibrating body and an inner peripheral surface of an opening of an exterior member of the mobile device such that the elastic body attaches the vibrating body to the exterior member,
   wherein the vibrating body includes an emblem portion which serves as an emblem of the mobile device, and the emblem portion is mounted on at least one of a front surface, side surface, and rear surface of the exterior member of the mobile device,
   the upper part of the frame is fixed to a rear surface of the exterior member of the mobile device,
   the emblem portion of the vibrating body is located at an outer side of the upper part of the frame.

6. The sounding body according to claim 5,
   wherein an outer surface of the exterior member of the mobile device and an outer face of the emblem portion are not covered with the elastic body.

7. A sounding body included in an audio reproduction device for use with a mobile device, the sounding body comprising:
   a vibrating body;
   a diaphragm acoustically coupled to a rear surface of the vibrating body via a cavity and apart from the vibrating body so that the vibrating body and the diaphragm do not contact each other;
   a voice coil coupled to the diaphragm directly;
   a magnetic circuit having a magnetic gap into which the voice coil is inserted; and
   a frame including a bottom coupled to the magnetic circuit and an upper part supporting the vibrating body with respect to the magnetic circuit,
   wherein the vibrating body serves as an emblem mounted on at least one of a front surface, side surface, and rear surface of an exterior member of the mobile device, and
   the upper part of the frame and an outer part of the diaphragm are fixed to a rear surface of the exterior member of the mobile device.

8. The sounding body according to claim 7, further comprising
   an elastic body disposed between an outer periphery of the vibrating body and an inner periphery of an opening of the exterior member of the mobile device such that the elastic body attaches the vibrating body to the exterior member.

9. A sounding body included in an audio reproduction device for use with a mobile device, the sounding body comprising:
   a vibrating body;
   a voice coil coupled to a rear surface of the vibrating body directly;
   a magnetic circuit having a magnetic gap into which the voice coil is inserted;
   a frame including a bottom coupled to the magnetic circuit and an upper part supporting the vibrating body with respect to the magnetic circuit; and
   an elastic body coupled to an outer peripheral surface of the vibrating body and an inner peripheral surface of an opening of an exterior member of the mobile device such that the elastic body attaches the vibrating body to be flush with the exterior member,
   wherein the vibrating body serves as an emblem mounted on at least one of a front surface, side surface, and rear surface of the exterior member of the mobile device, and
   an outer surface of the exterior member of the mobile device and an outer face of the emblem portion are not covered with the elastic body.

10. The sounding body according to claim 9,
    wherein an outer surface of the exterior member of the mobile device and an outer face of the vibrating body are not covered with the elastic body.

* * * * *